United States Patent
Hikichi

(10) Patent No.: US 10,397,315 B2
(45) Date of Patent: Aug. 27, 2019

(54) INFORMATION PROCESSING APPARATUS AND LOAD DISTRIBUTION CONTROL METHOD

(71) Applicant: FUJITSU LIMITED, Kawasaki-shi, Kanagawa (JP)

(72) Inventor: Kenji Hikichi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 167 days.

(21) Appl. No.: 15/581,168

(22) Filed: Apr. 28, 2017

(65) Prior Publication Data
US 2017/0346886 A1    Nov. 30, 2017

(30) Foreign Application Priority Data

May 26, 2016  (JP) .................. 2016-105589
Feb. 17, 2017  (JP) .................. 2017-028289

(51) Int. Cl.
*H04L 29/08* (2006.01)
*G06F 9/00* (2006.01)
(Continued)

(52) U.S. Cl.
CPC .......... *H04L 67/1017* (2013.01); *G06F 9/00* (2013.01); *H04L 41/0896* (2013.01); *H04L 47/125* (2013.01); *H04L 67/28* (2013.01)

(58) Field of Classification Search
CPC ..... G06F 9/00; H04L 41/0896; H04L 47/125; H04L 67/1017; H04L 67/28
See application file for complete search history.

(56) References Cited

U.S. PATENT DOCUMENTS 6,324,177 B1 * 11/2001 Howes ................ H01R 31/005
                                                  370/389
8,185,615 B1 *  5/2012 McDysan ............. H04L 29/06
                                                  370/229

(Continued)

FOREIGN PATENT DOCUMENTS

| JP | 2000268004 | 9/2000 |
| JP | 2015228538 | 12/2015 |
| JP | 2016528797 | 9/2016 |

OTHER PUBLICATIONS

"What is Destination and Target in Route table (AWS VPC)?" printed from https://stackoverflow.com/questions/47374929/what Year: 2017).*

*Primary Examiner* — Alina A Boutah
(74) *Attorney, Agent, or Firm* — Staas & Halsey LLP

(57) ABSTRACT

An information processing apparatus comprising a first processor configured to, for each of a plurality of control apparatuses, determine weights to be used for distribution of requests for predetermined processing so that a larger amount of requests for the predetermined processing is distributed to a control apparatus controlling a larger number of destination apparatuses. Each of the plurality of control apparatuses includes a second processor configured to: receive a request distributed to own control apparatus; perform the predetermined processing according to the request; create a message; transmit the message to a destination apparatus that is a destination of the message when a control apparatus controlling the destination apparatus is the own control apparatus; and forward the message to another control apparatus when the control apparatus controlling the destination apparatus that is a destination of the message is the other control apparatus.

16 Claims, 35 Drawing Sheets

(51) Int. Cl.
*H04L 12/24* (2006.01)
*H04L 12/803* (2013.01)

(56) References Cited

U.S. PATENT DOCUMENTS

| | | | |
|---|---|---|---|
| 2010/0278046 A1* | 11/2010 | Mateos Perez | H04L 45/12 |
| | | | 370/235 |
| 2015/0081762 A1* | 3/2015 | Mason | H04L 47/21 |
| | | | 709/203 |
| 2015/0350085 A1 | 12/2015 | Soumiya et al. | |
| 2015/0358236 A1* | 12/2015 | Roach | H04L 43/065 |
| | | | 370/235 |
| 2016/0164787 A1* | 6/2016 | Roach | H04L 47/125 |
| | | | 370/235 |
| 2016/0173320 A1 | 6/2016 | Khasnabish | |
| 2016/0173338 A1* | 6/2016 | Wolting | H04L 41/145 |
| | | | 709/223 |
| 2016/0301632 A1* | 10/2016 | Anand | H04L 47/125 |
| 2017/0102757 A1* | 4/2017 | Kang | G06F 9/45558 |
| 2019/0104206 A1* | 4/2019 | Goel | H04L 47/15 |

* cited by examiner

FIG.5

EXAMPLE OF MEASUREMENT RESULTS IN SERVER 1

| APPLICATION | REQUESTS | MESSAGES (DIRECT) | MESSAGES (INDIRECT) |
|---|---|---|---|
| DC#1 CONTROL | 20 | 40 | 20 |
| DC#2 CONTROL | 10 | 10 | 30 |
| WAN CONTROL | 5 | 5 | 5 |

FIG.6

EXAMPLE OF MEASUREMENT RESULTS IN SERVER 2

| APPLICATION | REQUESTS | MESSAGES (DIRECT) | MESSAGES (INDIRECT) |
|---|---|---|---|
| DC#1 CONTROL | 20 | 20 | 40 |
| DC#2 CONTROL | 10 | 30 | 10 |
| WAN CONTROL | 5 | 5 | 5 |

FIG.7

DIRECT RATIO FOR EACH APPLICATION

| APPLICATION | SERVER 1 | SERVER 2 |
|---|---|---|
| DC#1 CONTROL | 2/3 | 1/3 |
| DC#2 CONTROL | 1/4 | 3/4 |
| WAN CONTROL | 1/2 | 1/2 |

FIG.8

GENERATED REQUESTS AMOUNTS FROM APPLICATIONS

| DC#1 CONTROL (R1) | DC#2 CONTROL (R2) | WAN CONTROL (R3) |
|---|---|---|
| 40 | 20 | 10 |

ASSIGNMENT RESULTS

| APPLICATION | SERVER 1 | SERVER 2 |
|---|---|---|
| DC#1 CONTROL | 35 | 5 |
| DC#2 CONTROL | 0 | 20 |
| WAN CONTROL | 0 | 10 |

FIG.11

ROUND-ROBIN WEIGHTS

| APPLICATION | SERVER 1 | SERVER 2 |
|---|---|---|
| DC#1 CONTROL | 7/8 | 1/8 |
| DC#2 CONTROL | 0 | 1 |
| WAN CONTROL | 0 | 1 |

FIG.13

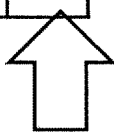

COMPARATIVE EXAMPLE: EQUAL DISTRIBUTION

SERVER 1

| APPLI-CATION | RE-QUESTS | MESSAGES (DIRECT) | MESSAGES (INDIRECT) |
|---|---|---|---|
| DC#1 CONTROL | 20 | 40 | 20 |
| DC#2 CONTROL | 10 | 10 | 30 |
| WAN CONTROL | 5 | 5 | 5 |

SERVER 2

| APPLI-CATION | RE-QUESTS | MESSAGES (DIRECT) | MESSAGES (INDIRECT) |
|---|---|---|---|
| DC#1 CONTROL | 20 | 20 | 40 |
| DC#2 CONTROL | 10 | 30 | 10 |
| WAN CONTROL | 5 | 5 | 5 |

110 MESSAGES

FIRST EMBODIMENT

SERVER 1

| APPLI-CATION | RE-QUESTS | MESSAGES (DIRECT) | MESSAGES (INDIRECT) |
|---|---|---|---|
| DC#1 CONTROL | 35 | 70 | 35 |
| DC#2 CONTROL | 0 | 0 | 0 |
| WAN CONTROL | 0 | 0 | 0 |

SERVER 2

| APPLI-CATION | RE-QUESTS | MESSAGES (DIRECT) | MESSAGES (INDIRECT) |
|---|---|---|---|
| DC#1 CONTROL | 5 | 5 | 10 |
| DC#2 CONTROL | 20 | 60 | 20 |
| WAN CONTROL | 10 | 10 | 10 |

75 MESSAGES

FIG.14

RATIOS OF SWITCHES FOR WHICH EACH
CONTROLLER SERVE AS MASTER IN EACH
APPLICATION

| APPLICATION | SERVER 1 | SERVER 2 |
|---|---|---|
| DC#1 CONTROL | 2/3 | 1/3 |
| DC#2 CONTROL | 1/4 | 3/4 |
| WAN CONTROL | 1/2 | 1/2 |

FIG.17

CAPACITIES OF SERVERS

| SERVER 1 (C1) | SERVER 2 (C2) |
|---|---|
| 40 | 35 |

FIG.18

REQUEST AMOUNTS Xij TO ASSIGNED TO APPLICATIONS i ON SERVERS j

| APPLICATION | SERVER 1 | SERVER 2 |
|---|---|---|
| DC#1 CONTROL | 40 | 0 |
| DC#2 CONTROL | 0 | 20 |
| WAN CONTROL | 0 | 10 |

FIG.19

ROUND-ROBIN WEIGHTS Wij

| APPLICATION | SERVER 1 | SERVER 2 |
|---|---|---|
| DC#1 CONTROL | 1 | 0 |
| DC#2 CONTROL | 0 | 1 |
| WAN CONTROL | 0 | 1 |

FIG.20

SERVER 1

| APPLICATION | REQUESTS | MESSAGES (DIRECT) | MESSAGES (INDIRECT) |
|---|---|---|---|
| DC#1 CONTROL | 40 | 80 | 40 |
| DC#2 CONTROL | 0 | 0 | 0 |
| WAN CONTROL | 0 | 0 | 0 |

SERVER 2

| APPLICATION | REQUESTS | MESSAGES (DIRECT) | MESSAGES (INDIRECT) |
|---|---|---|---|
| DC#1 CONTROL | 0 | 0 | 0 |
| DC#2 CONTROL | 20 | 60 | 20 |
| WAN CONTROL | 10 | 10 | 10 |

70 MESSAGES

*FIG.22*

| APPLICATION | SERVER HAVING HIGH DIRECT RATIO |
|---|---|
| DC#1 CONTROL | SERVER 1 |
| DC#2 CONTROL | SERVER 2 |
| WAN CONTROL | SERVER 1 |

FIG.23

COMPARATIVE EXAMPLE: EQUAL DISTRIBUTION

SERVER 1

| APPLI-CATION | RE-QUESTS | MESSAGES (DIRECT) | MESSAGES (INDIRECT) |
|---|---|---|---|
| DC#1 CONTROL | 20 | 40 | 20 |
| DC#2 CONTROL | 10 | 10 | 30 |
| WAN CONTROL | 5 | 5 | 5 |

SERVER 2

| APPLI-CATION | RE-QUESTS | MESSAGES (DIRECT) | MESSAGES (INDIRECT) |
|---|---|---|---|
| DC#1 CONTROL | 20 | 20 | 40 |
| DC#2 CONTROL | 10 | 30 | 10 |
| WAN CONTROL | 5 | 5 | 5 |

110 MESSAGES

FIFTH EMBODIMENT

SERVER 1

| APPLI-CATION | RE-QUESTS | MESSAGES (DIRECT) | MESSAGES (INDIRECT) |
|---|---|---|---|
| DC#1 CONTROL | 40 | 80 | 40 |
| DC#2 CONTROL | 0 | 0 | 0 |
| WAN CONTROL | 10 | 10 | 10 |

SERVER 2

| APPLI-CATION | RE-QUESTS | MESSAGES (DIRECT) | MESSAGES (INDIRECT) |
|---|---|---|---|
| DC#1 CONTROL | 0 | 0 | 0 |
| DC#2 CONTROL | 20 | 60 | 20 |
| WAN CONTROL | 0 | 0 | 0 |

70 MESSAGES

RELATED ART

RELATED ART

RELATED ART

FIG.28

MASTER INFORMATION

| SWITCH | SW#1 | SW#2 | SW#3 | SW#4 | SW#5 | SW#6 | SW#7 |
|---|---|---|---|---|---|---|---|
| MASTER | C#1 | C#1 | C#2 | C#2 | C#1 | C#1 | C#2 |

FIG.29

| MASTER CHANGE INFORMATION | 1 | 2 | 3 | 4 | 5 | 6 | 7 |
|---|---|---|---|---|---|---|---|
| OBJECT SWITCH | SW#1 | SW#2 | SW#3 | SW#4 | SW#5 | SW#6 | SW#7 |
| MASTER AFTER CHANGE | C#2 | C#2 | C#1 | C#1 | C#2 | C#2 | C#1 |

*FIG.30*

| APPLICATION | SwitchList$_i$ |
|---|---|
| APPLICATION#1 | {SW#1, SW#1, SW#5, SW#4, ...} |
| APPLICATION#2 | {SW#3, SW#2, SW#3, SW#6, SW#7, ...} |

FIG.31

DIRECT RATIOS ACCORDING TO SPECIFIC EXAMPLE

|  | C#1 | C#2 |
|---|---|---|
| APPLICATION#1 | 1/4 | 3/4 |
| APPLICATION#2 | 3/5 | 2/5 |

FIG.32

GENERATED REQUEST AMOUNTS FOR APPLICATIONS ACCORDING TO SPECIFIC EXAMPLE

| APPLICATION | REQUEST AMOUNTS |
|---|---|
| APPLICATION#1 | 20 |
| APPLICATION#2 | 10 |

FIG.33

ROUND-ROBIN WEIGHTS ACCORDING TO SPECIFIC EXAMPLE

|  | C#1 | C#2 |
|---|---|---|
| APPLICATION#1 | 1/4 | 3/4 |
| APPLICATION#2 | 1 | 0 |

FIG.34

EXAMPLE OF SIMULATION RESULTS

| MASTER CHANGE INFORMATION | 1 | 2 | 3 | 4 | 5 | 6 | 7 |
|---|---|---|---|---|---|---|---|
| OBJECT SWITCH | SW#1 | SW#2 | SW#3 | SW#4 | SW#5 | SW#6 | SW#7 |
| MASTER AFTER CHANGE | C#2 | C#2 | C#1 | C#1 | C#2 | C#2 | C#1 |
| CONTROLLER-TO-CONTROLLER MESSAGE AMOUNT | 12 | 10 | 15 | 16 | 11 | 16 | 12 |
| VARIANCE | 3 | 4 | 8 | 8 | 3 | 1 | 3 |

FIG.35

MASTER INFORMATION AFTER APPLICATION OF MASTER CHANGE INFORMATION

| SWITCH | SW#1 | SW#2 | SW#3 | SW#4 | SW#5 | SW#6 | SW#7 |
|---|---|---|---|---|---|---|---|
| $Masters_k$ | C#1 | C#2 (#1 BEFORE CHANGE) | C#2 | C#2 | C#1 | C#1 | C#2 |

FIG.38

EXAMPLE OF DIRECT RATIOS

|  | C#1 | C#2 |
|---|---|---|
| APPLICATION#1 | 1/2 | 1/2 |
| APPLICATION#2 | 2/3 | 1/3 |

FIG.39

EXAMPLE OF VARIANCE VALUES OF DIRECT RATIOS

|  | VARIANCE VALUES OF DIRECT RATIOS |
|---|---|
| APPLICATION#1 | 0 |
| APPLICATION#2 | ABOUT 0.28 |

FIG.40

NUMBERS OF MESSAGES TRANSMITTED TO SWITCHES FOR APPLICATION #1

|  | SW#1 | SW#2 | SW#3 | SW#4 | SW#5 | SW#6 | SW#7 |
|---|---|---|---|---|---|---|---|
| APPLICATION#1 | 5 | 3 | 10 | 30 | 15 | 20 | 1 |

INFORMATION PROCESSING APPARATUS AND LOAD DISTRIBUTION CONTROL METHOD

CROSS-REFERENCE TO RELATED APPLICATION

This application is based upon and claims the benefit of priority of the prior Japanese Patent Application No. 2016-105589, filed on May 26, 2016, and the Japanese Patent Application No. 2017-028289, filed on Feb. 17, 2017, the entire contents of which are incorporated herein by reference.

FIELD

The present invention relates to an information processing apparatus and a load balancing control method.

BACKGROUND

For the purpose of flexible changing settings of a network, SDN (software-defined networking) techniques have been developed. In SDN, a communication apparatus, a communication control apparatus that manages the communication apparatus, and a control network connecting the communication apparatus and the communication control apparatus are included. In SDN, the communication apparatus is specialized in a forwarding function. The communication apparatus is managed by the communication control apparatus. Hereinafter, a communication apparatus in SDN is referred to as a switch. Also, a communication control apparatus in SDN is referred to as a controller.

In SDN, network control logics for, e.g., path calculation are installed in communication control software on a controller. For example, the communication control software is software that calculates a path and notifies the controller of the path to cause the controller to set the path for switches. Hereinafter, communication control software is referred to as "application".

One of applications in SDN is, for example, a path setting application that, upon an input of a request for setting a path between two points from a user, creates control messages for switches connecting the designated two points.

FIG. 24 is a diagram illustrating an example of a distributed-type communication control system P100. In SDN, in a case where one controller is provided, performance of the controller may fail to keep up with expansion of the scale of the network. The distributed-type communication control system P100 includes a plurality of controllers, and the plurality of controllers share management of switches (SWs in the figure) to enhance processing performance. A controller that controls a switch is referred to as a "master" for the controlled switch. For one switch, there is one controller that serves as a master therefor. Also, one controller may be a master of a plurality of switches. In FIG. 24, a controller is installed in each of a server P1 and a server P2, and the controllers included in the server P1 and the server P2 each serve as a master for three switches.

For example, because a service policy and/or a demand for band control differs depending on each organization or area of a user, a path setting application is provided for each of organizations or areas of users. In other words, in the distributed-type communication control system P100, there are plural types of path setting applications, and an instance of a same type of application operates on each of one or more servers. An instance refers to an application on a server. In the example illustrated in FIG. 24, an instance of one type of path setting application operates on the server P1 and the server P2.

FIG. 25 is a diagram illustrating an example of a flow of a control message when a path setting request is input to a path setting application in a distributed-type communication control system P100. In FIG. 25, a distributed-type communication control system P100 that is the same as that of FIG. 24 is illustrated. The example in FIG. 24 is an example of a case where a path setting request for setting a path between sites Ha-Hb is input to the path setting application on the server P1.

According to the path setting application on the server P1, a route passing through switch #1 and switch #2 is calculated as a path between the sites Ha-Hb, and a control message for setting the path between the sites Ha-Hb is created for each of switch #1 and switch #2. A master for switch #1 is the controller on the server P1. A master for switch #2 is the controller on the server P2.

Since the master for switch #1 is the controller on the server P1 on which an instance that created the control message operates, the control message for switch #1 is transmitted from the server P1 to switch #1, which is a destination. Hereinafter, a control message is simply referred to as "message".

PATENT DOCUMENT

[Patent document 1] Japanese Patent Laid-Open No. 2000-268004

However, in the distributed-type communication control system P100, the following problem may occur. In the distributed-type communication control system P100, if a message is transmitted from a plurality of controllers to one switch, there is a possibility of a failure to keep the integrity of settings of the switch. In order to reduce the possibility of a failure to keep the integrity of settings for a switch, a message for the switch is specified to be transmitted from a controller in a master for the switch. A controller in a master for switch #2 is the controller on the server P2, which is different from the server P1 implementing an instance that created the message. Therefore, a message for switch #2 is forwarded from the server P1 to the server P2 and transmitted from the server P2 to switch #2.

For example, time consumed until the message is delivered to switch #2 is longer than time consumed until a message is delivered to switch #1 by the amount of forwarding of the message between the controllers. Consequently, a state in which setting of the path between the sites Ha-Hb has been completed in the switch #1 while the path between sites Ha-Hb is not set in the switch #2 occurs, which may adversely affect data forwarding. Therefore, message forwarding between the controllers may be a cause of deterioration in performance of the distributed-type communication control system P100 and thus is preferably small.

FIG. 26 is a diagram illustrating an example of a distributed-type communication control system including a load balancing apparatus. A load balancing apparatus P3 accepts requests to respective applications and equally distributes the requests to respective servers. Consequently, processing loads on the applications on the respective servers can be equalized. However, control message forwarding between controllers is not taken into consideration, and thus, equal distribution of requests to applications to respective servers not necessarily enables reduction in message forwarding between the controllers.

SUMMARY

One of aspects of the present invention is an information processing apparatus. 1. The information processing apparatus comprising: a first processor configured to, for each of a plurality of control apparatuses, determine weights to be used for distribution of requests for predetermined processing so that a larger amount of requests for the predetermined processing is distributed to a control apparatus controlling a larger number of destination apparatuses. Each of the plurality of the control apparatuses includes a second processor configured to: receive a request distributed to own control apparatus from among requests distributed between the plurality of control apparatuses; perform the predetermined processing according to the request; create a message; transmit the message to a destination apparatus that is a destination of the message when a control apparatus controlling the destination apparatus is the own control apparatus; and forward the message to another control apparatus when the control apparatus controlling the destination apparatus that is a destination of the message is other control apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an example of results of measurement of request amounts and message amounts in a server 1 in the example illustrated in FIG. 4;

FIG. 6 is an example of results of measurement of request amounts and message amounts in a server 2 in the example illustrated in FIG. 4;

FIG. 7 is a diagram indicating a direct ratio for each application in each server in the specific example;

FIG. 8 is an example of generated request amounts from the respective applications in the specific example;

FIG. 11 is an example of round-robin weights Wij provided to a load balancing apparatus, according to the specific example;

FIG. 13 is a diagram indicating an example of message amounts in the respective servers in a comparative example and message amounts in the respective servers when the weights Wij calculated in the specific example are used, where respective states of request amounts for each application are in a same condition;

FIG. 14 is a diagram indicating an example of a constant Aij in a linear programming problem according to an variation of the first embodiment;

FIG. 17 is a diagram indicating an example of capacities Cj of servers according to a third embodiment;

FIG. 18 is a diagram indicating an example of values of request amounts Xij for applications i to be assigned to servers j, which have been calculated by linear programming relative to the setting of the values of the capacities Cj of the servers in FIG. 17;

FIG. 19 is a diagram indicating an example of round-robin weights for a load balancing apparatus, which correspond to the values of the request amounts Xij of the applications i to be assigned to the servers j in FIG. 18;

FIG. 20 is a diagram indicating an example of message amounts for a server 1 and a server 2 where requests from each application are distributed to the server 1 and the server 2 using the weights Wij indicated in FIG. 19 when respective states of request amounts for the respective applications are in a same condition;

FIG. 22 is a diagram indicating an example of a server having a highest direct ratio for each application according to a fifth embodiment;

FIG. 23 is a diagram indicating an example of message amounts in respective servers in a comparative example and message amounts in the respective servers when requests are distributed to the server indicated in FIG. 22 for each application, where respective states of request amounts for each application are in a same condition;

FIG. 28 is an example of master information according to the specific example of the sixth embodiment;

FIG. 29 is a diagram indicating an example of master change information according to the specific example of the sixth embodiment;

FIG. 30 is a diagram indicating an example of switch lists according to the specific example of the sixth embodiment;

FIG. 31 is a diagram indicating an example of direct ratios Aij for applications i in controllers j according to the specific example of the sixth embodiment;

FIG. 32 is a diagram indicating an example of generated request amounts for applications according to the specific example of the sixth embodiment;

FIG. 33 is an example of round-robin weights Wij for a load balancing apparatus according to the specific example of the sixth embodiment;

FIG. 34 is a diagram indicating an example of simulation results according to the specific example of the sixth embodiment;

FIG. 35 is a diagram indicating an example of master information after application of master change information #2 according to the specific example of the sixth embodiment;

FIG. 38 is a diagram indicating an example of direct ratios Aij for applications i in controllers j according to a specific example of a seventh embodiment;

FIG. 39 is a diagram indicating an example of variance values of direct ratios for respective applications according to the specific example of the seventh embodiment;

FIG. 40 is an example of amounts of messages transmitted to respective switches for application #1 according to the specific example of the seventh embodiment;

DESCRIPTION OF EMBODIMENTS

Embodiments of the present invention will be described below with reference to the drawings. Configurations of the embodiments below are mere examples, and the present invention is not limited to the configurations of the embodiments.

First Embodiment

Figure 1:
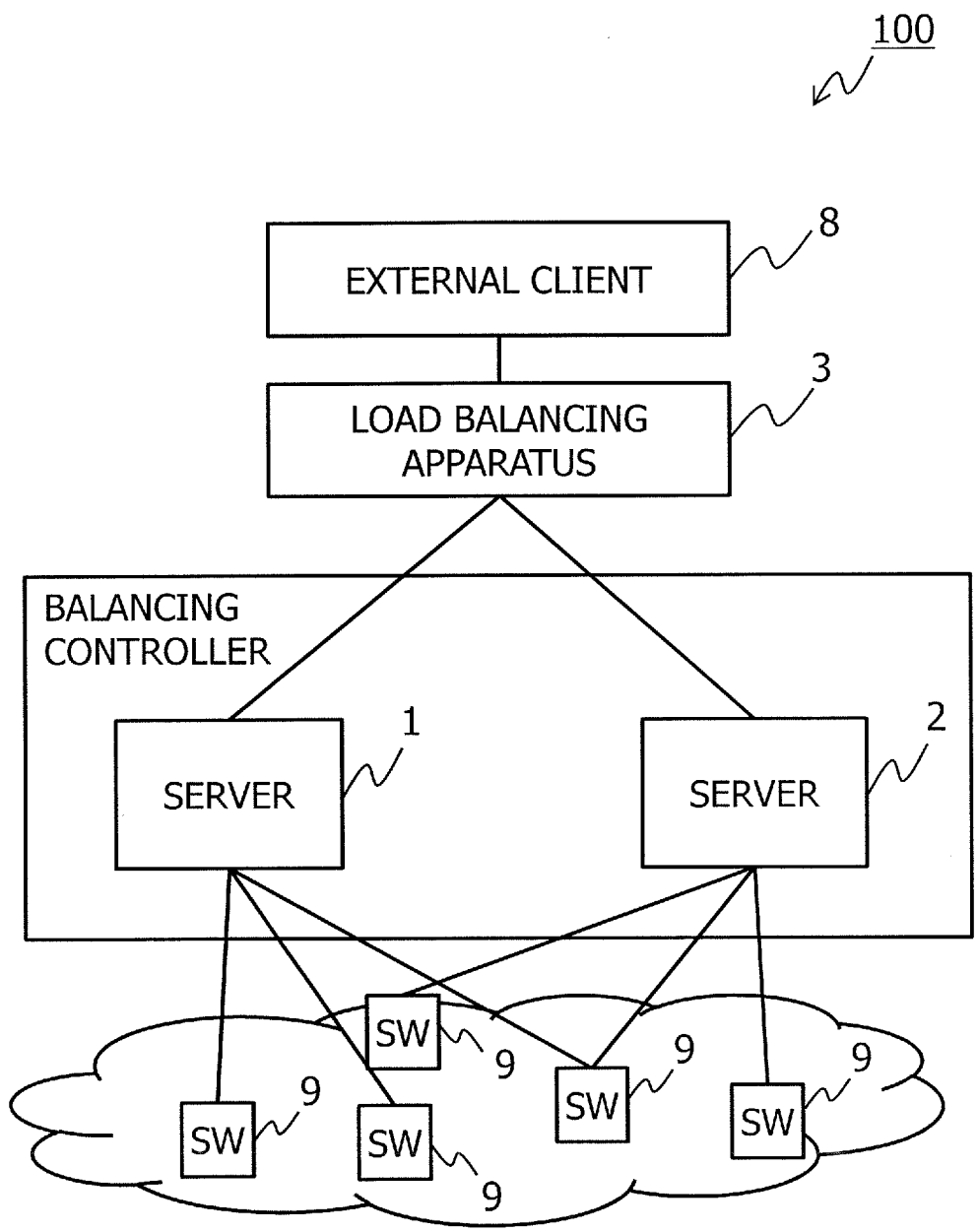
FIG. 1 is a diagram illustrating an example of a system configuration of a distributed-type communication control system according to a first embodiment.

FIG. 1 is a diagram illustrating an example of a system configuration of a distributed-type communication control system 100 according to a first embodiment. The distributed-type communication control system 100 includes a server 1, a server 2, a load balancing apparatus 3, a plurality of switches 9 and an external client 8. In each of the server 1 and the server 2, applications and a controller are installed. The load balancing apparatus 3 distributes and transmits requests for applications from the external client 8 to the server 1 and the server 2 by means of a weighed round robin. The server 1 and the server 2 each operate as a master for a plurality of switches 9.

Message forwarding between controllers occurs where an instance that creates a message and a controller that is a master for a switch 9 that is a destination of the message are provided on different servers. Therefore, as a server on which an instance that creates a message is provided and a server on which a controller that is a master of a switch 9 that is a destination of the message is provided are more likely to be the same, message forwarding between controllers is less likely to occur.

One of factors determining the likelihood of an instance that creates a message and a controller that is a master for a switch 9 that is a destination of the message being provided on a same server is the number of switches controlled by a controller as a master, for each controller. Therefore, distributing a larger number of requests to a controller controlling a larger number of switches enables an increase in likelihood of an instance that creates a message and a controller that is a master for a switch 9 that is a destination of the message being provided on a same server.

Also, another one of the factors determining the likelihood of an instance that creates a message and a controller that is a master for a switch 9 that is a destination of the message being provided on a same server is an imbalance of controllers that serve as masters for switches 9 of control objects of the applications. There are plural types of applications, and there is an imbalance of the control object switches 9 in each type. For example, in a case where a predetermined application controls switches provided in a particular area, an imbalance of controllers that serve as masters for the switches 9 in that area occurs.

An imbalance of controllers that serve as masters for switches of control objects of an application and the number of switches controlled by each controller as a master are reflected in a ratio of messages directly forwarded to the switches, or a ratio of messages forwarded to other controllers. In the first embodiment, using linear programming, weights used in a round robin in the load balancing apparatus 3 are determined based on the ratio of the amount of messages directly forwarded to switches in each server so that the amount of messages directly forwarded to the switches becomes largest. The round-robin weights are determined for each application.

In the first embodiment, the server 1 determines the round-robin weights. However, the present invention is not limited to this example, and either the server 2 or the load balancing apparatus 3 may determine the round-robin weights. An apparatus that determines round-robin weights is an example of "information processing apparatus". The server 1 in the first embodiment is an example of "information processing apparatus". Also, each of the server 1 and the server 2 is an example of "control apparatus". Each of the switches 9 is an example of "destination apparatus".

<Apparatus Configuration>

Figure 2:
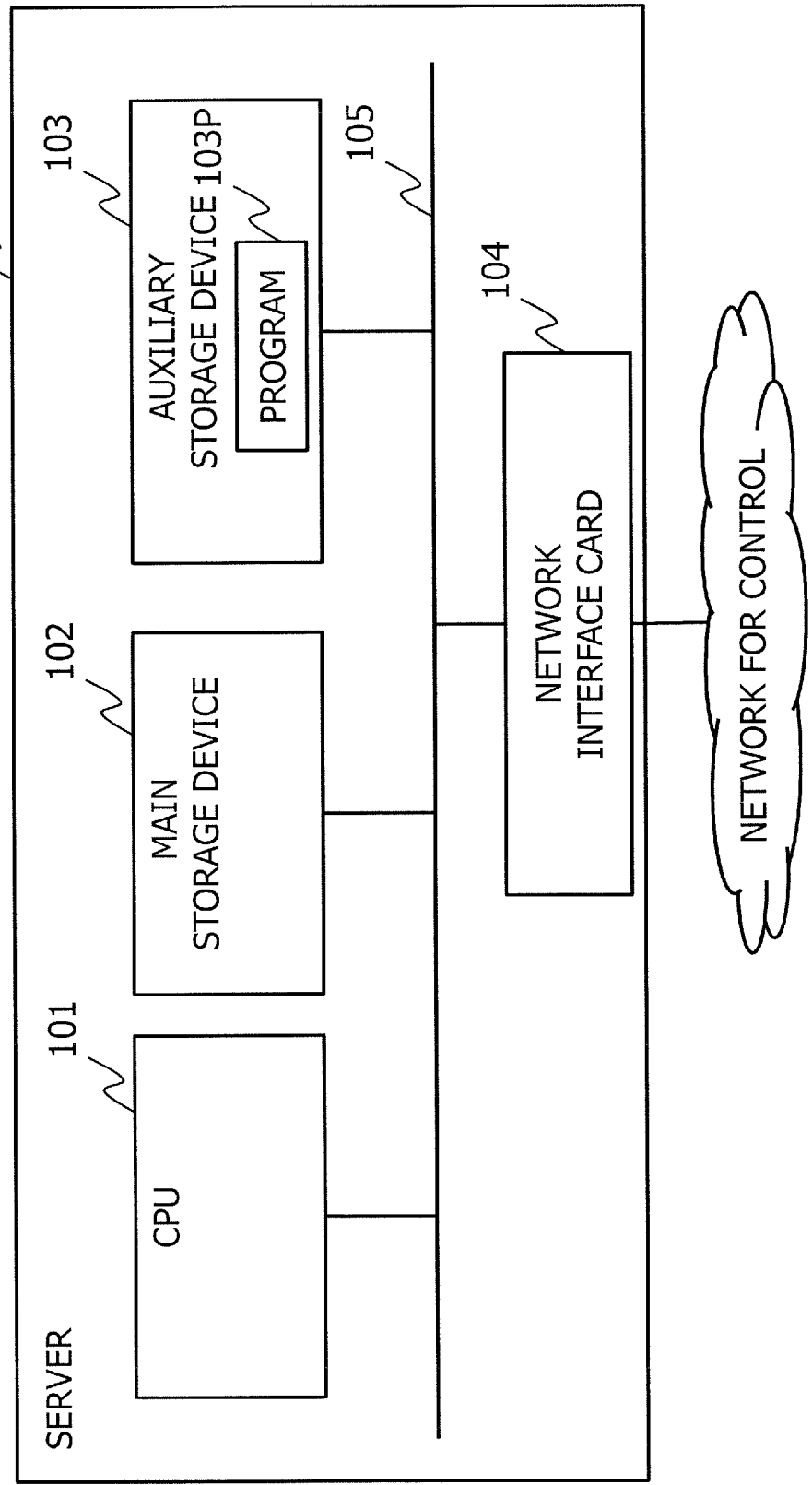
FIG. 2 is an example of a hardware configuration of a server.

FIG. 2 is an example of a hardware configuration of the server 1. The server 1 is, for example, a dedicated computer. The server 1 includes a CPU (Central Processing Unit) 101, a main storage device 102, an auxiliary storage device 103 and a network interface 104. Also, these components are mutually connected via a bus 105.

The auxiliary storage device 103 stores an OS (Operating System), various programs and data to be used by the CPU 101 for execution of the respective programs. The auxiliary storage device 103 is, for example, a non-volatile memory such as an EPROM (Erasable Programmable ROM), a flash memory or a hard disk drive. The auxiliary storage device 103 stores, for example, a controller program 103P and path setting applications.

The main storage device 102 is a storage device that provides a storage area and a work area for loading programs stored in the auxiliary storage device 103, to the CPU 101 or is used as a buffer. The main storage device 102 includes, for example, a semiconductor memory such as a ROM (Read-Only Memory) or a RAM (Random Access Memory). The main storage device 102 is an example of "storage".

The CPU 101 loads the OS and various application programs held in the auxiliary storage device 103 into the main storage device 102 and executes the OS and the application programs to perform various processing. The number of CPUs 101 is not limited to one and a plurality of CPUs 101 may be provided. The CPU 101 is an example of "first processor" of "information processing apparatus" and "second processor" of "control apparatus".

The network interface 104 is an interface via which information is input/output from/to a control network. The network interface 104 may be an interface for connection with a wired network or an interface for connection with a wireless network. The network interface 104 is, for example, an NIC (Network Interface Card).

Note that the hardware configuration of the server 1 illustrated in FIG. 2 is a mere example, and the hardware configuration in the present invention is not limited to the above and components may arbitrarily be omitted, replaced and/or added depending on the embodiment. For example, the server 1 may include a removable recording medium drive device to execute a program recorded in a removable recording medium. The removable recording medium is, for example, a recording medium such as an SD card, a miniSD card, a microSD card, a USB (Universal Serial Bus) flash memory, a CD (Compact Disc), a DVD (Digital Versatile Disc), a Blu-ray (registered trademark) disc or a flash memory card. Note that as with the hardware configuration illustrated in FIG. 2, the server 2 and the load balancing apparatus 3 also each include a CPU, a main storage device, an auxiliary storage device and a network interface.

Figure 3:
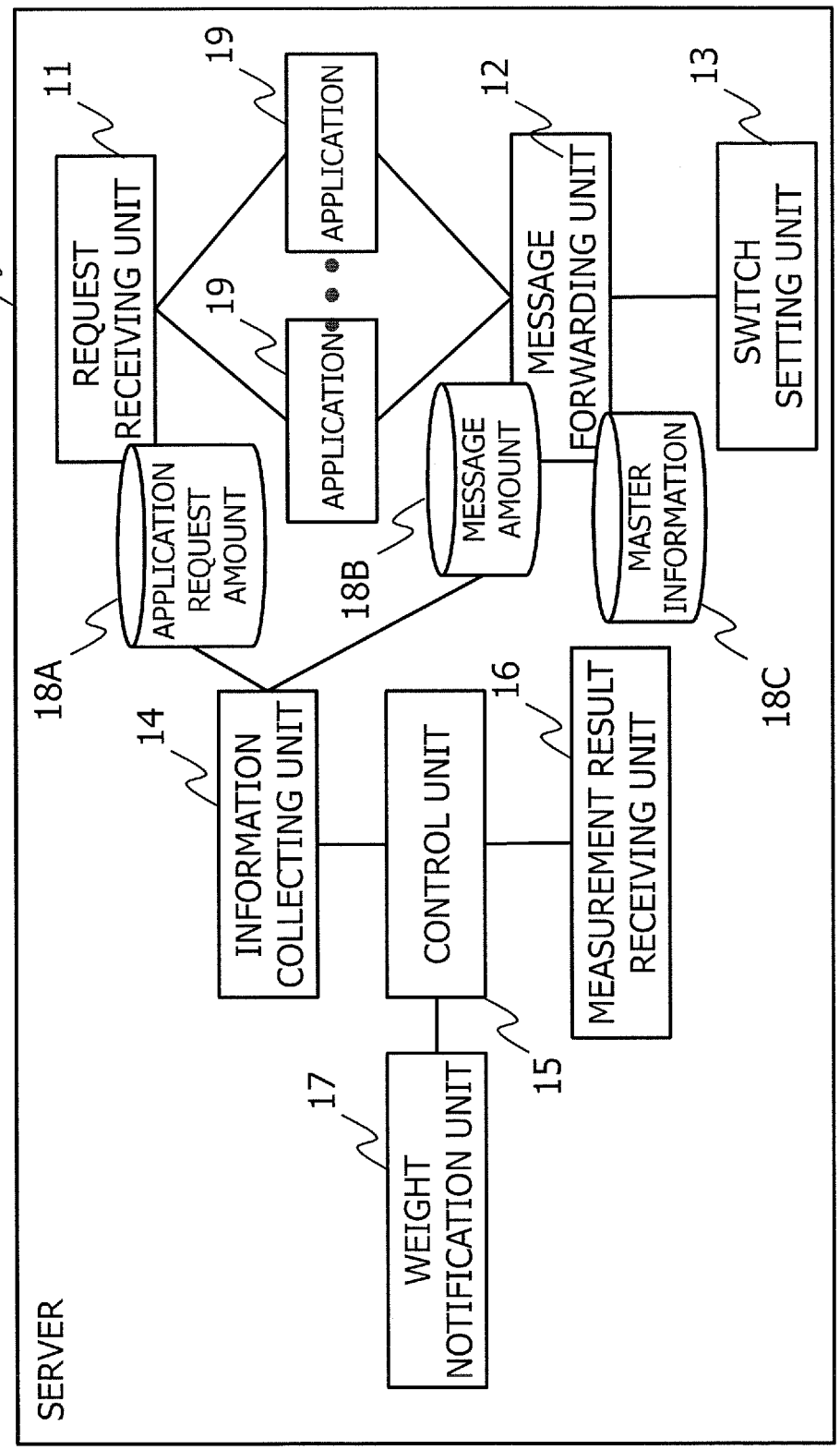
FIG. 3 is a diagram illustrating an example of a functional configuration of a server.

FIG. 3 is a diagram illustrating an example of a functional configuration of the server 1. The server 1 includes a request receiving unit 11, a message forwarding unit 12, a switch setting unit 13, an information collecting unit 14, a control unit 15, a measurement result receiving unit 16, a weight notification unit 17, an application request amount storage unit 18A, a message amount storage unit 18B, a master information storage unit 18C and applications 19 as functional components. The request receiving unit 11, the message forwarding unit 12, the switch setting unit 13, the information collecting unit 14, the control unit 15, the measurement result receiving unit 16, the weight notification unit 17, the application request amount storage unit 18A, the message amount storage unit 18B and the master information storage unit 18C are, for example, functional components provided by execution of the controller program 103P by the CPU 101.

The request receiving unit 11 receives a request to any of the applications 19, which has been distributed to the server 1 by the load balancing apparatus 3. The request receiving unit 11 outputs the request to the relevant application 19. Also, the request receiving unit 11 records a received request amount in the application request amount storage unit 18A, for each application 19.

The applications 19 are, for example, path setting applications. For example, the applications 19 are provided for each user organization or each area, according to a policy and/or a band control demand of the use organization or the area. Each application 19 receives an input of a request from the request receiving unit 11. The application 19 performs predetermined processing according to the request, creates messages each including identification information of a switch 9 that is an object of setting according to a result of the processing and outputs the messages to the message forwarding unit 12.

In the first embodiment, it is assumed that the applications 19 are path setting applications. Therefore, a request to an application 19 is, for example, a request for setting a path between two sites. Also, the application 19 performs processing for calculating a route of a path between the two sites designated by the request. A result of the processing by the application 19 is calculated route information. The route information includes, for example, identification information pieces of switches 9 on the route and an output interface of each switch 9 on the route. Therefore, in the first embodiment, messages created by the application 19 each include an identification information piece of a switch 9 on a route obtained as a result of path calculation. Note that since there are one or more switches on a route, the number of messages created for one request is the number of switches on the route.

Also, in the first embodiment, it is assumed that Open-Flow is used as a protocol for controlling the switches 9. Thus, a message created by an application 19 is an Open-Flow message.

The message forwarding unit 12 receives an input of the messages from the application 19. The message forwarding unit 12 refers to master information and transmits the messages to the switch setting unit 13 or the server 2 according to the switches 9 that is destinations of the messages. The master information is information on correspondence between an identification information piece of each switch and an identification information piece of a controller that serves as a master of the switch. The identification information piece of each switch and the identification information piece of a controller that serves as a master are, for example, a switch name/a controller name and/or IP (Internet Protocol) addresses.

If the controller that is a master of the switch 9 that is a destination of a message is installed in the server 1, the message forwarding unit 12 outputs the message to the switch setting unit 13. If the controller that is a master of the switch 9 that is a destination of a message is installed in the other server 2, the message forwarding unit 12 forwards the message to the server 2.

The message forwarding unit 12 records an amount of messages forwarded to the switch setting unit 13 and an amount of messages forwarded to the server 2 in the message amount storage unit 18B, for each application 19. Hereinafter, messages forwarded to the switch setting unit 13 are referred to as "direct messages". Also, messages forwarded to the other server 2 are referred to as "indirect messages".

The switch setting unit 13 receives an input of messages from the message forwarding unit 12 or the other server 2. The switch setting unit 13 transmits the messages to the switches 9 which the server 1 controls as a master.

The information collecting unit 14 acquires a request amount, a direct message amount and an indirect message amount for each application on a predetermined period from the application request amount storage unit 18A and the message amount storage unit 18B and outputs the request amount, the direct message amount and the indirect message amount to the control unit 15. The period of acquisition of the request amount, the direct message amount and the indirect message amount for each application is set, for example, in seconds by a manager of the distributed-type communication control system 100.

The measurement result receiving unit 16 receives a request amount, a direct message amount and an indirect message amount for each application in the other server 2, which are transmitted on a predetermined period from the other server 2 and outputs the request amount, the direct message amount and the indirect message amount for each application in the other server 2 to the control unit 15.

The control unit 15 receives the input of the request amount, the direct message amount and the indirect message amount for each application in the server 1 from the information collecting unit 14. Also, the control unit 15 receives the input of the request amount, the direct message amount and the indirect message amount for each application in the server 2 from the measurement result receiving unit 16.

The control unit 15 determines round-robin weights for the load balancing apparatus 3 based on the request amount, the direct message amount and the indirect message amount for each application in each of the server 1 and the server 2. Details of the weight determination processing will be described later. The control unit 15 outputs the determined weights to the weight notification unit 17.

The weight notification unit 17 receives the input of the round-robin weights for the load balancing apparatus 3 from the control unit 15 and notifies the load balancing apparatus 3 of the round-robin weights.

The application request amount storage unit 18A, the message amount storage unit 18B and the master information storage unit 18C correspond to respective predetermined areas in a storage area of the main storage device 102 of the server 1. The application request amount storage unit 18A stores an amount of requests input from the load balancing apparatus 3 to the server 1, for each application. The message amount storage unit 18B stores an amount of direct messages and an amount of indirect messages for each application. Values held by the application request amount storage unit 18A and the message amount storage unit 18B may be reset by, or may be held without being reset by, for example, acquisition of information by the information collecting unit 14. If the respective values held by the application request amount storage unit 18A and the message amount storage unit 18B are not reset by acquisition of information by the information collecting unit 14, the information collecting unit 14 acquires differences from values read last time, as a request amount, a direct message amount and an indirect message amount on a predetermined period.

The master information storage unit 18C stores the master information. The master information is set in advance by, for example, the manager of the distributed-type communication control system 100. Or, the master information may be determined by negotiation between the controllers. The method for determining the master information is not limited to these methods.

Note that a functional configuration of the server 2 is a configuration including the components other than the control unit 15, the measurement result receiving unit 16 and the weight notification unit 17 in the functional configuration of the server 1. In the server 2, the information collecting unit 14 transmits information acquired from an application request amount storage unit 18A and a message amount storage unit 18B, to the server 1 on a predetermined period.

<Details of Round-Robin Weight Determination Processing>

Figure 4:
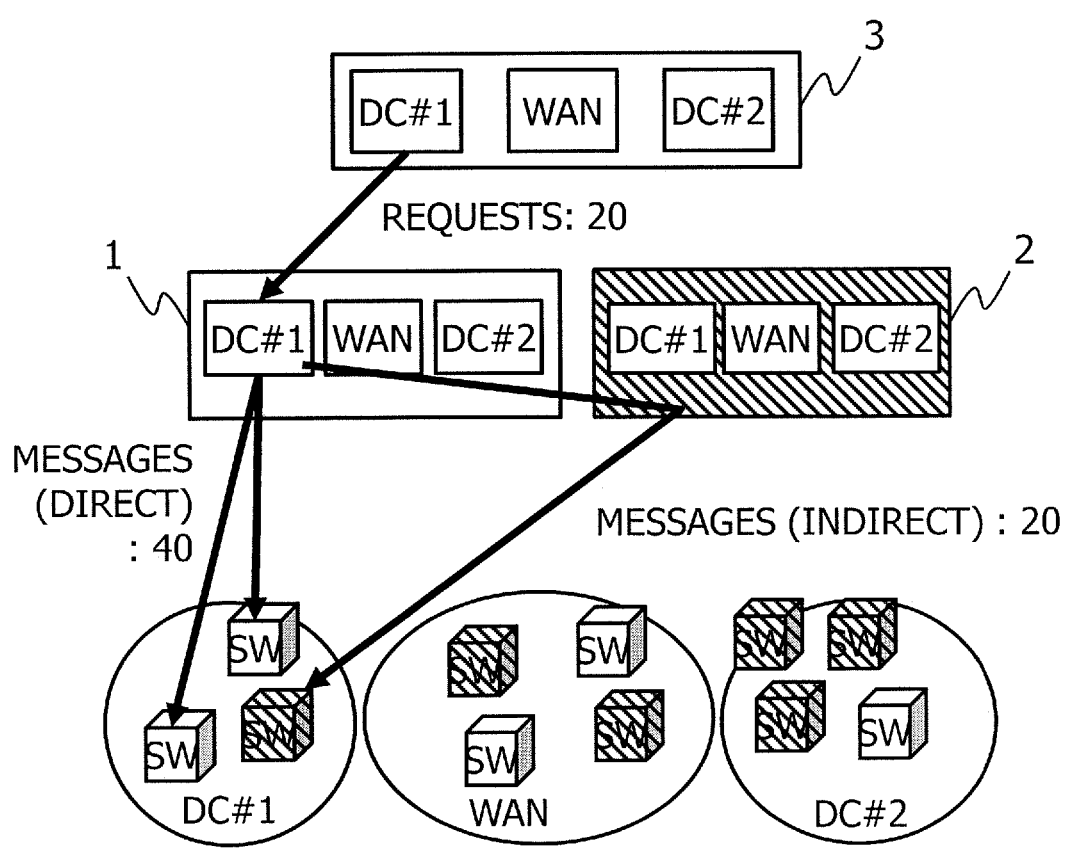
FIG. 4 is a diagram illustrating an example of a distributed-type communication control system assumed in a specific example of processing for determining weights to be used by a load balancing apparatus.

FIG. 4 is a diagram illustrating an example of the distributed-type communication control system 100 assumed in a specific example of processing for determining weights to be used by the load balancing apparatus 3. A network formed by the switches 9 is divided into three areas, data center (DC) #1, data center #2 and a WAN. An application is provided for each of the areas, DC#1, DC#2 and the WAN. In each of the load balancing apparatus 3, the server 1 and the server 2, there are instances of a DC#1 control application, a DC#2 control application and a WAN control application for DC#1, DC#2 and WAN, respectively.

(Step 1)

The control unit 15 of the server 1 acquires results of measurement of the amounts of requests and the amounts of messages for the server 1 and the server 2. In the specific example, it is assumed that the results in FIGS. 5 and 6 have been acquired.

FIG. 5 is an example of results of measurement of request amounts and message amounts in the server 1 in the example illustrated in FIG. 4. FIG. 5 indicates that the DC#1 control application in the server 1 receives a request amount of 20 and creates a total of 60 messages for the request amount of 20. Of the messages created by the DC#1 control application in the server 1, 40 are direct messages and 20 are indirect messages.

It is indicated that the DC#2 control application in the server 1 receives a request amount of 10 and creates a total of 40 messages for the request amount of 10. Of the messages created by the DC#2 control application in the server 1, 10 are direct messages and 30 are indirect messages.

It is indicated that the WAN control application in the server 1 receives a request amount of 5 and creates a total of 10 messages for the request amount of 5. Of the messages created by the WAN control application in the server 1, 5 are direct messages and 5 are indirect messages.

FIG. 6 is a diagram indicating an example of results of measurement of request amounts and message amounts in the server 2 in the example illustrated in FIG. 4. FIG. 6 indicates that the DC#1 control application in the server 2 receives a request amount of 20 and creates a total of 60 messages for the request amount of 20. Of the messages created by the DC#1 control application in the server 2, 20 are direct messages and 40 are indirect messages.

It is indicated that the DC#2 control application in the server 2 receives a request amount of 10 and creates a total of 40 messages for the request amount of 10. Of the messages created by the DC#2 control application in the server 2, 30 are direct messages and 10 are indirect messages.

It is indicated that the WAN control application in the server 2 receives a request amount of 5 and creates a total of 10 messages for the request amount of 5. Of the messages created by the WAN control application in the server 2, 5 are direct messages and 5 are indirect messages.

Here, units of the request amounts and the message amounts may be, for example, the number of requests and the number of messages, respectively, or each may be, e.g., an inflow/outflow amount (kbps) per unit time.

(Step 2)

The control unit 15 of the server 1 calculates a ratio of the direct message amount to the total message amount for each of combinations of an application and a server, based on the request amounts and the message amounts collected from the server 1 and the server 2. A ratio of a direct message amount to a total message amount for a predetermined application on a predetermined server is referred to as "direct ratio".

FIG. 7 is a diagram indicating a direct ratio for each application in each server in the specific example. In the example indicated in FIG. 5, the total number of messages for the DC#1 control application in the server 1 is 60 and the direct message amount is 40, and thus, a direct ratio for the DC#1 control application in the server 1 is 40/60=2/3. In the example indicated in FIG. 6, the total number of messages for the DC#1 control application in the server 2 is 60 and the direct message amount is 20, and thus, a direct ratio for the DC#1 control application in the server 2 is 20/60=1/3.

Likewise, a direct ratio can be calculated for each of the DC#2 control application and the WAN application in each of the servers.

(Step 3)

The control unit 15 of the server 1 calculates an amount of requests generated from each application based on the request amounts for each application, which have been collected from the server 1 and the server 2. Hereinafter, an amount of requests generated from an application is referred to as "generated request amount".

FIG. 8 is an example of the generated request amounts from the respective applications in the specific example. The generated request amount from each application is calculated as a total sum of amounts of requests for the application, which have been collected from the respective servers. For example, for the DC#1 control application, FIG. 5 indicates that a request amount distributed to the server 1 is 20, and FIG. 6 indicates that a request amount distributed to the server 2 is 20, and thus, the generated request amount from the DC#1 control application is calculated as 20+20=40. Likewise, for each of the DC#2 control application and the WAN control application, the generated request amount is calculated.

(Step 4)

The control unit 15 of the server 1 calculates an amount of requests that can be accepted by each server, based on the request amounts for each application, which have been collected from the server 1 and the server 2. Hereinafter, an amount of requests that can be accepted by a server is referred to as "capacity".

Figure 9:
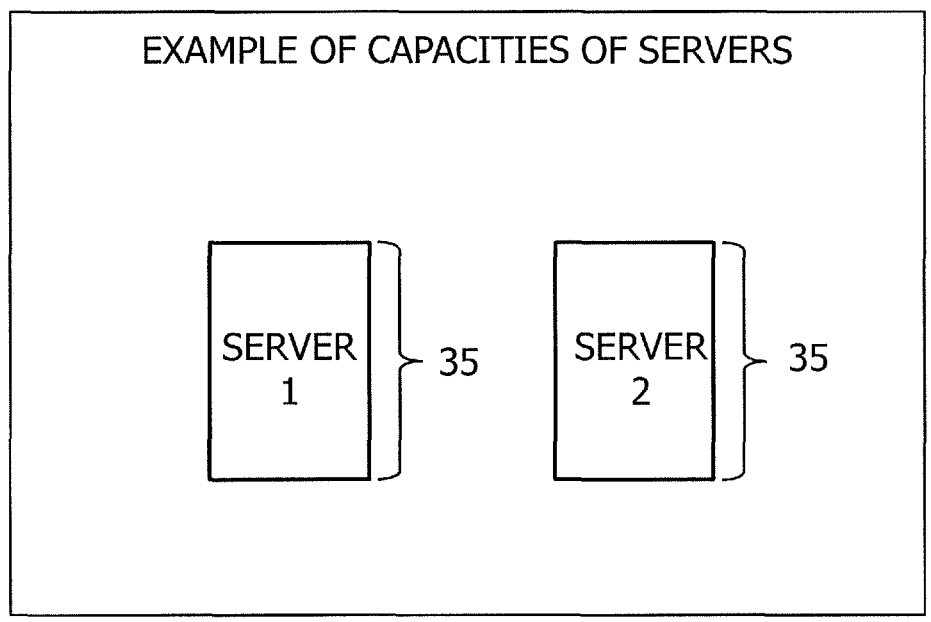
FIG. 9 is an example of capacities of the respective servers according to the specific example.

FIG. 9 is an example of capacities of the respective servers according to the specific example. In the first embodiment, a capacity of each server is calculated as a value resulting from dividing a total amount of generated request amounts from all of the applications in the distributed-type communication control system 100 by the number of the servers.

In the specific example, from FIG. 8, a total amount of generated request amounts from all of the applications can be calculated as 40+20+10=70 by adding up the respective generated request amounts from the DC#1 control application, the DC#2 control application and the WAN application. In the specific example, the number of servers is two, that is, the server 1 and the server 2. Accordingly, the capacity of each server in the specific example can be calculated as 70/2=35.

(Step 5)

The control unit 15 of the server 1 solves a linear programming problem using the direct ratios, the generated request amount from each application and the capacities of each server. In the first embodiment, an objective function and constraint conditions are set as follows.

Objective function $\Sigma_{i=1, j=1}^{m,n} A_{ij} X_{ij}$ [Expression 1]

$A_{ij}$: Direct ratio (constant) for application i on server j
$X_{ij}$: Request amount (variable) assigned to server j from among requests from application i
m: Number of applications in system
n: Number of servers $\Sigma_{i=1}^{m} X_{ij} = C$  C: Capacity of server   Constraint condition 1

$\Sigma_{j=1}^{n} X_{ij} = R_i$  $R_i$:Generated request amount from application i   Constraint condition 2

The objective function is a function for estimating a total amount of direct messages for each server and each application. Constraint condition 1 is intended to provide an upper limit constraint to a request amount assigned to each server. Constraint condition 2 is intended to limit a generated request amount from each application to a state that is the same as that at the time of measurement.

The control unit 15 of the server 1 solves a linear programming problem that makes a value of the objective function largest under the above constraint conditions. As a solution to the linear programming problem, a value of $X_{ij}$ where the objective function has the largest value is obtained. In other words, the control unit 15 of the server 1 calculates request amounts to be assigned to the respective servers for each application so that a total amount of direct messages become largest, in a request generation state that is the same as that at the time of measurement and in a state in which the capacities of the servers have an upper limit. When the total amount of direct messages is largest, an amount of indirect messages, that is, messages forwarded between the controllers is smallest.

In the specific example, values of $A_{ij}$ are values of direct ratios for the respective applications on the respective servers, which are indicated in FIG. 7. Values of $R_i$ are values of the generated request amounts from the respective applications, which are indicated in FIG. 8. Values of C are values of the capacities of the respective servers, which are indicated in FIG. 9.

Figure 10:
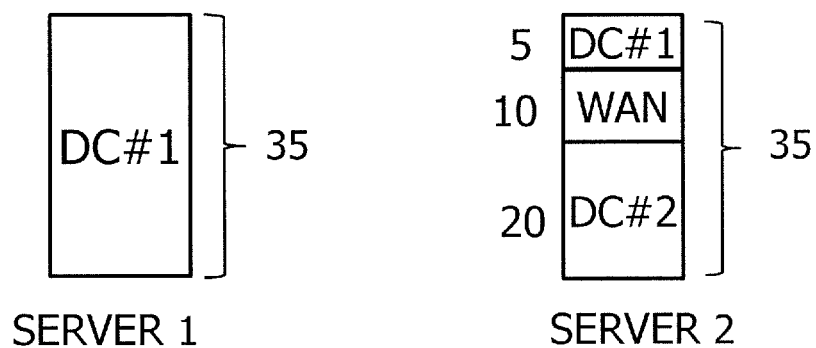
FIG. 10 is a diagram illustrating an example of a solution Xij to a linear programming problem according to the specific example.

FIG. 10 is a diagram illustrating an example of a solution $X_{ij}$ to a linear programming problem according to the specific example. 35 requests from the DC#1 control application are assigned to the server 1. 5 requests from the DC#1 control application, 20 requests from the DC#2 control application and 10 requests from the WAN control application are assigned to the server 2.

(Step 6)

The control unit 15 of the server 1 calculates ratios of requests to be assigned to the respective servers, for each application, from the solution $X_{ij}$ to the linear programming problem. The control unit 15 of the server 1 notifies the load balancing apparatus 3 of the ratios of requests to be assigned to the respective server for the respective applications, as weights to be used for a round robin by the load balancing apparatus 3, through the weight notification unit 17.

A weight $W_{ij}$ of distribution of requests to a server j for an application i is calculated by $W_{ij} = X_{ij}/R_i$. $R_i$ is a generated request amount from the application i.

FIG. 11 is an example of round-robin weights $W_{ij}$ provided to the load balancing apparatus 3, according to the specific example. Subsequently, the load balancing apparatus 3 distributes requests from the DC#1 control application to the server 1 with a weight of 7/8 and to the server 2 with a weight of 1/8 and distributes all of requests from the DC#2 control application and the WAN control application to the server 2.

The control unit 15 of the server 1 repeats steps 1 to 6 above on a predetermined period. Depending on change in generated request amounts, the round-robin weights for the load balancing apparatus 3 change, and thus, adjustment is made according to change of the request amount so that messages forwarded between the controllers are smallest. A direct message is an example of "first message". An indirect message is an example of "second message". A "direct ratio" is an example of "first ratio".

<Flow of Processing>

Figure 12:
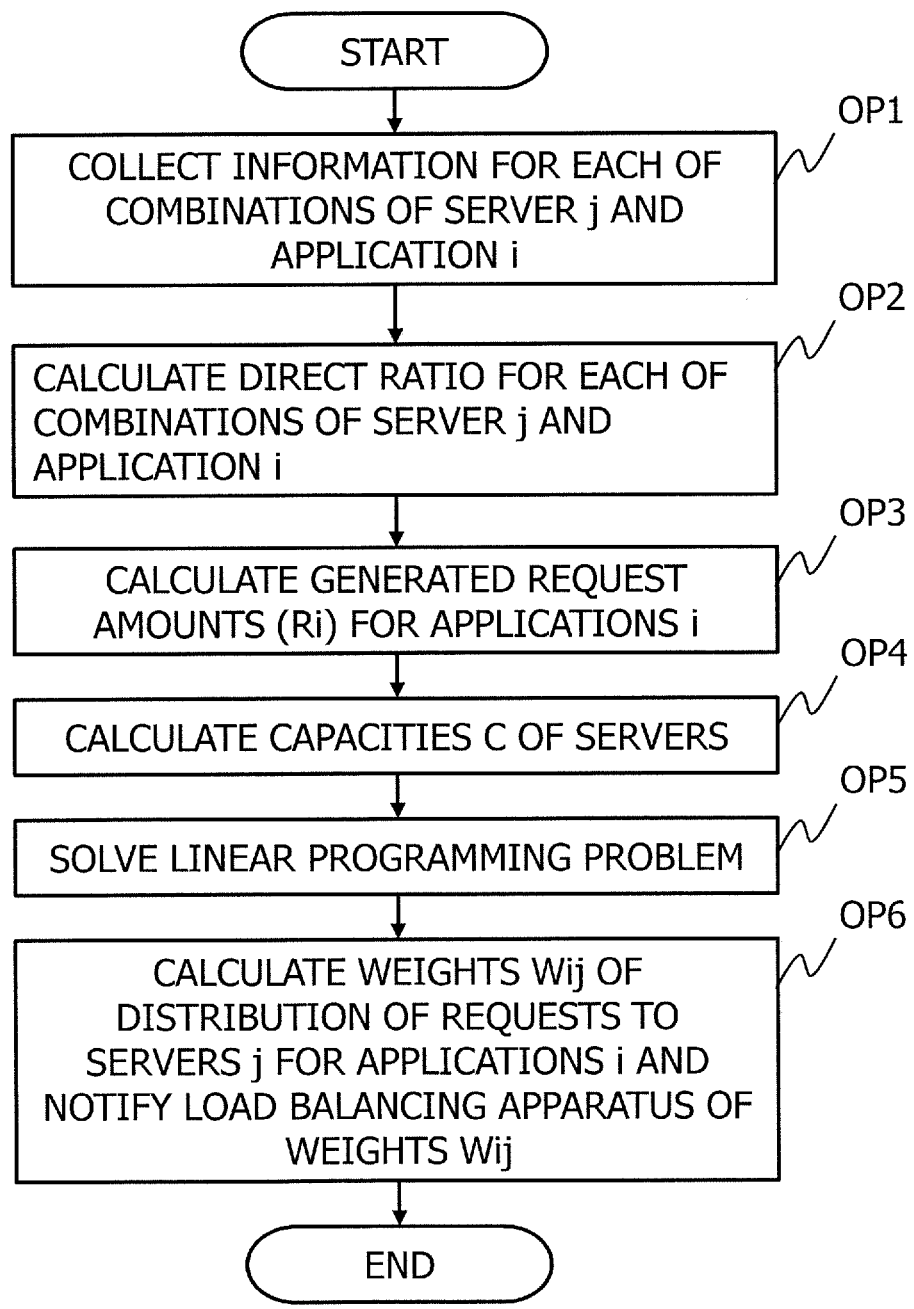
FIG. 12 is an example of a flowchart of processing by a control unit for determining round-robin weights for the load balancing apparatus.

FIG. 12 is an example of a flowchart of processing for determining round-robin weights for the load balancing apparatus 3, by the control unit 15 of the server 1. The processing indicated in FIG. 12 is repeated on a period that is the same as a period of an input of information on request amounts and message amounts for the server 1 and the server 2 to the control unit 15 of the server 1. Although an entity that performs the processing indicated in FIG. 12 is the CPU 101, for sake of convenience, the description will be provided with the control unit 15, which is a functional component, as the entity.

In OP1, the control unit 15 acquires a request amount, a direct message amount and an indirect message amount for each of combinations of a server and an application, from the information collecting unit 14.

In OP2, the control unit 15 calculates a direct ratio Aij for each of the combinations of a server and an application. In OP3, the control unit 15 calculates a generated request amount Ri for each application. In OP4, the control unit 15 calculates capacities C of the servers. In OP5, the control unit 15 solves a linear programming problem.

In OP6, the control unit 15 calculates weights Wij of distribution of requests to servers j for applications i and notifies the load balancing apparatus 3 of the weights Wij. Then, the processing indicated in FIG. 12 ends.

Operation and Effects of First Embodiment

FIG. 13 is a diagram indicating an example of message amounts for the server 1 and the server 2 in a comparative example and message amounts for the server 1 and the server 2 when the weights Wij calculated in the specific example are used, in a case where respective states of request amounts for each application are in a same condition. The comparative example in FIG. 13 is an example of a case where requests are equally distributed between the server 1 and the server 2. Measurement results for the server 1 and the server 2 in the comparative example in FIG. 13 are the same as those indicated in FIGS. 5 and 6, respectively.

In the comparative example, a total amount of indirect messages for all of the applications in the server 1 is 55, and a total amount of indirect messages for all of the applications in the server 2 is 55. A total of the indirect message amounts in the server 1 and the server 2 in the comparative example is 55+55=110.

In a case where the weights Wij calculated in the specific example are used, a total amount of indirect messages for all of the applications in the server 1 is 35, and a total amount of indirect messages for all of the applications in the server 2 is 40. In the specific example, a total of indirect message amounts in the server 1 and the server 2 is 35+40=75.

Therefore, according to the first embodiment, change in round-robin weights for the load balancing apparatus 3 enables reduction in amount of messages forwarded between the controllers (indirect messages). Also, in FIG. 13, a total of request amounts in the server 1 and a total of request amounts in the server 2 in the specific example are the same. This is attributable to provision of the upper limit to the capacities of the servers in the linear programming problem as a constraint condition. Therefore, the first embodiment enables balancing processing loads between servers while reducing an amount of messages forwarded between controllers. Also, linear programming can relatively easily be implemented because an existing library can be used.

Note that in the first embodiment, the direct ratio is set as the constant Aij in the linear programming problem, a solution Xij that makes the value of the objective function largest is calculated, and based on the solution Xij, round-robin weights for the load balancing apparatus 3 are determined. Instead of this, an indirect ratio of indirect messages to a total amount of messages for an application i in a server j may be set as the constant Aij in the linear programming problem. In this case, the objective function provides an amount of messages forwarded between controllers (indirect message amount), and thus, the solution Xij is calculated as one that makes the value of the objective function smallest. Round-robin weights for the load balancing apparatus 3 are ratios of requests assigned to the respective servers for the respective applications, which have been obtained from the solution Xij.

Variation of First Embodiment

In the first embodiment, a direct ratio of each server for each application is used for the constant Aij in the linear programming problem. Instead of this, if setting object switches 9 for each application are identified in advance, a ratio of switches for which each controller serves as a master in the switches may be set as the constant Aij in the linear programming problem. For example, in the example illustrated in FIG. 4, in the DC#1 control application, from among the three setting object switches, two are switches for which the server 1 serves as a master and one is a switch for which the server 2 serves as a master. In the DC#2 control application, from among the four setting object switches, one is a switch for which the server 1 serves as a master, and three are switches for which the server 2 serves as a master. In the WAN control application, from among the four setting object switches, two are switches for which the server 1 serves as a master, and two are switches for which the server 2 serves as a master.

FIG. 14 is a diagram indicating an example of a constant Aij in a linear programming problem according to an variation of the first embodiment. The example indicated in FIG. 14 is premised on the system configuration in FIG. 4. The constant Aij in the linear programming problem in the example indicated in FIG. 14 is a ratio of switches for which each controller serves as a master for each application. Values of the constant Aij in the linear programming problem in the example indicated in FIG. 14 coincide with the values of the constant Aij in the linear programming problem according to the first embodiment, which are indicated in FIG. 7, and thus, as a solution to the linear programming problem, values that are the same as those in the example indicated in FIG. 10 are obtained. Therefore, the variation of the first embodiment also enables reduction in amount of messages forwarded between controllers.

Second Embodiment

In a second embodiment, round-robin weights to be used when a load balancing apparatus 3 assigns requests to each server for each application are determined using not linear programming, but a heuristic algorithm. A heuristic algorithm is a method that does not necessarily provide a right answer but can provide a solution having a certain level of closeness to a right answer.

In the second embodiment, description in common to that of the first embodiment will be omitted. In the second embodiment, a system configuration, a hardware configuration of each apparatus, and a functional configuration are similar to those of the first embodiment. In the second embodiment, in the functional configuration, processing in the control unit 15 is different from that of the first embodiment.

Figure 15:
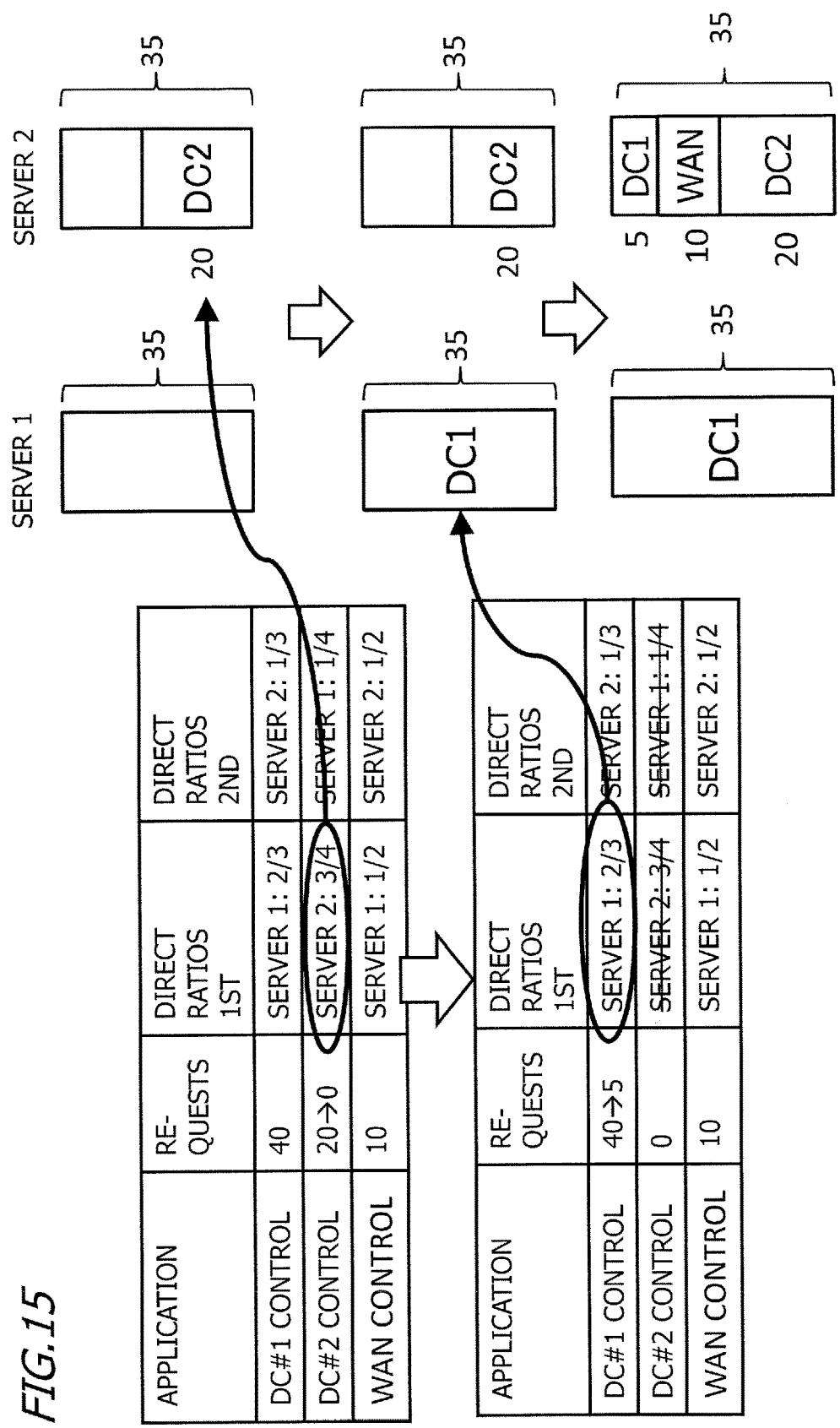
FIG. 15 is a diagram indicating an example of processing for determining round-robin weights for a load balancing apparatus, according to a second embodiment.

FIG. 15 is a diagram indicating an example of processing for determining round-robin weights for the load balancing apparatus 3, according to the second embodiment. In FIG. 15, the specific example in FIG. 4 is assumed. In the second embodiment, the control unit 15 performs step 1 (information collection), step 2 (direct ratios), step 3 (calculation of generated request amount for each application), step 4 (calculation of capacity of each server) in the round-robin weight determination processing in the first embodiment. The subsequent processing is as follows.

The table indicated in FIG. 15 includes a request amount r (i) and direct ratios a (i, j) for respective servers j for each application i. The direct ratios a (i, j) for the respective servers j are sorted in descending order of values. An initial value of a request amount r (i) for an application i is a generated request amount Ri for the application i. Furthermore, in FIG. 15, a capacity c (j) of each server j is indicated. An initial value of a capacity c (j) of each server j is a capacity C obtained by dividing a total amount of request amounts for all of applications by the number of controllers. The direct ratios a (i, j), the initial values Ri of the request amounts r (i) and the initial value C of the capacities c (j) of the servers are values that are the same as the examples indicated in FIGS. 7, 8 and 9, respectively.

First, the control unit 15 selects a combination of a DC#2 control application and a server 2 having a highest direct ratio a (2, 2) (=3/4), and assigns an amount of requests for the DC#2 control application that can be accepted by the server 2, to the server 2. In FIG. 15, the capacity c(2) of the server 2 is 35, and the request amount r(2) for the DC#2 control application is 20, and thus, all of the request amount r(2) for the DC#2 control application=20 are assigned to the server 2. The request amount r(2) for the DC#2 control application is rewritten from 20 to 0. Since the request amount r(2) for the DC#2 control application becomes 0, the processing for the DC#2 control application ends.

Next, the control unit 15 selects a combination of a DC#1 control application and a server 1 having a second highest direct ratio a (1, 1) (=2/3) and assigns an amount of requests for the DC#1 control application that can be accepted by the server 1, to the server 1. In FIG. 15, a capacity c(1) of the server 1 is 35, and a request amount r(1) for the DC#1 control application is 40, and thus, a request amount of 35 for the DC#1 control application, which is the capacity c(1) of the server 1, is assigned to the server 1. The request amount c(1) for the DC#1 control application is rewritten from 40 to 5. Since requests for the DC#1 control application are assigned up to the upper limit of the capacity of the server 1, subsequently, the server 1 is excluded from objects of the processing.

Next, the control unit 15 selects a combination of a WAN control application and the server 2 having a direct ratio a (3, 2) (=1/2) and assigns an amount of requests for the WAN control application that can be accepted by the server 2, to the server 2. Since the server 2 has already been assigned with 20 requests for the DC#2 control application, the capacity c(2) of the server 2 is 15. Since a request amount r(3) for the WAN control application is 10, the request amount r(3) for the WAN control application=10 are fully assigned to the server 2. The request amount r(3) for the WAN control application is rewritten from 10 to 0. Since the request amount r(3) for the WAN control application becomes 0, the processing for the WAN control application ends.

Next, the control unit 15 selects a combination of the DC#1 control application and the server 2 having a direct ratio a (1, 2) (=1/3) and an amount of requests for the DC#1 control application that can be accepted by the server 2, to the server 2. Since the server 2 has already assigned with 20 requests for the DC#2 control application and 10 requests for the WAN control application, the capacity c(2) of the server 2 is 5. In FIG. 15, since the capacity c(2) of the server 2 is 5 and the request amount r(1) for the DC#1 control application is 5, the remaining request amount r(1) for the DC#1 control application=5 is fully assigned to the server 2. The request amount r (1) for the DC#1 control application is rewritten from 5 to 0. The request amount r(1) for the DC#1 control application becomes 0, and the request amounts for all of the applications have become 0, and thus, the processing ends.

Ratios of amounts of requests to be assigned to the respective servers for the respective applications in FIG. 15 are the same as the results obtained when the linear programming of the first embodiment is used (see FIG. 10).

Figure 16:
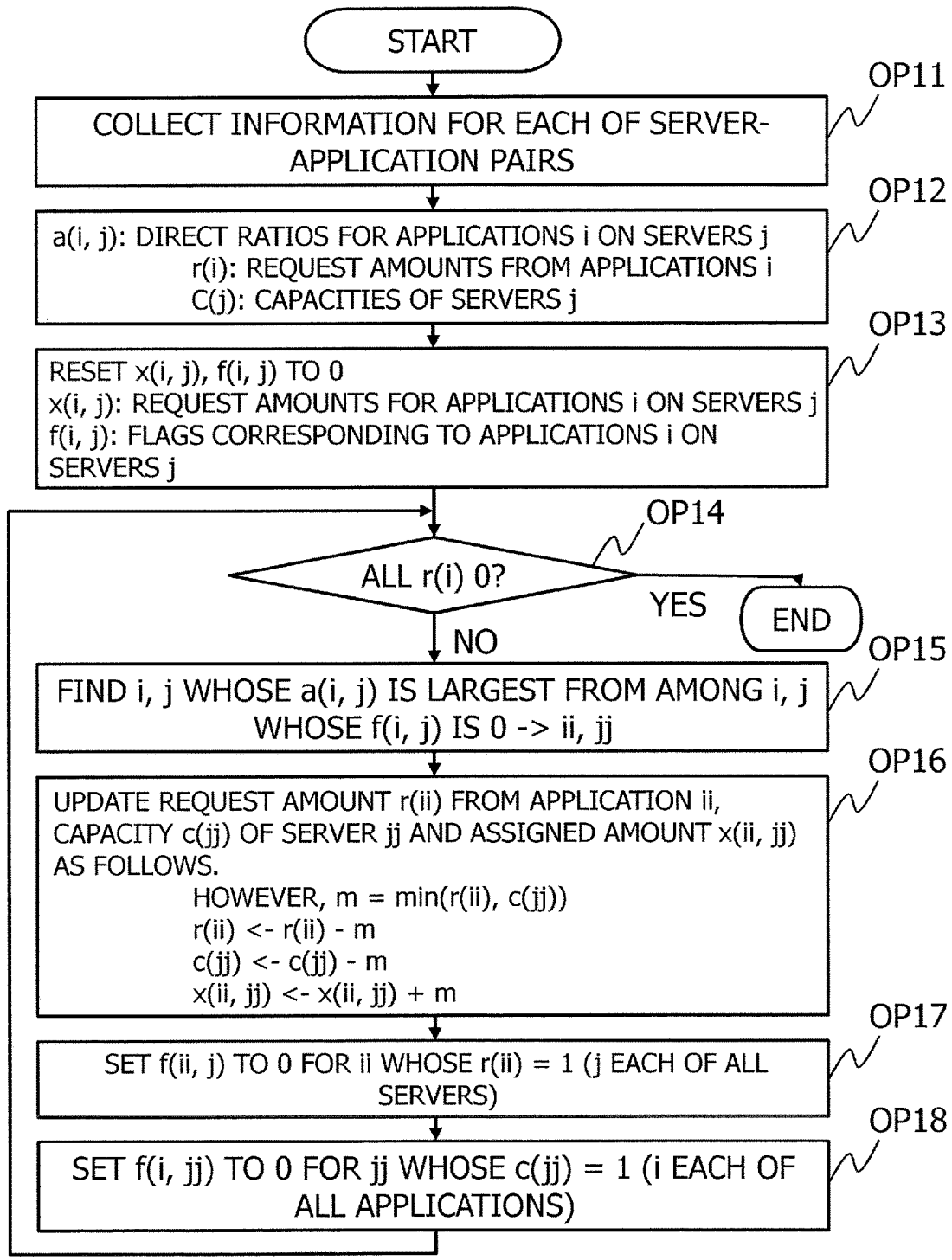
FIG. 16 is an example of a flowchart of processing for determining round-robin weights for the load balancing apparatus, by a control unit according to the second embodiment.

FIG. 16 is an example of a flowchart of processing for determining round-robin weights for a load balancing apparatus 3, by the control unit 15 of the server 1 according to the second embodiment. The processing indicated in FIG. 16 is repeated on a period that is the same as a period of an input of information on request amounts and message amounts for the server 1 and the server 2 to the control unit 15 of the server 1. Although an entity that performs the processing indicated in FIG. 16 is a CPU 101, for sake of convenience, the description will be provided with the control unit 15, which is a functional component, as the entity.

In OP11, the control unit 15 acquires a request amount, a direct message amount and an indirect message amount for each of combinations of a server and an application, from an information collecting unit 14.

In OP12, the control unit 15 calculates direct ratios a(i, j) of applications i on servers j, initial values Ri of request amounts r(i) from the applications i and an initial value C of a capacity C(j) of the servers j. Respective methods of calculation of the direct ratios a(i, j), the initial values Ri and the initial value C are similar to those of the first embodiment.

In OP13, the control unit 15 resets request amounts x(i, j) assigned to the applications i on the servers j and flags f(i, j) corresponding to the applications i on the servers j to 0, respectively. A flag f(i, j) corresponding to an application i on a server j indicates "unprocessed" if the flag f(i, j) is 0 and indicates "processed" if the flag f(i, j) is 1.

In OP14, the control unit 15 determines whether or not all of the request amounts r(i) from the applications i are 0. If all of the request amounts r(i) from the applications i are 0 (OP14: YES), the processing indicated in FIG. 16 ends. If any of the request amounts r(i) from the applications i is not 0 (OP14: NO), the processing proceeds to OP15.

In OP15, the control unit 15 finds an application i and a server j that provide a largest direct ratio a(i, j) from among the combinations of a server and an application whose flag f(i, j) is 0. Hereinafter, the application i and server j found in OP15 are indicated as "application ii" and "server jj", respectively.

In OP16, the control unit 15 updates the request amount r(ii) from the application ii, the capacity c(jj) of the server jj and the request amount x(ii, jj) to be assigned to the application ii on the server jj. Here, m is a value that is a smaller one of r(ii) and c(jj).

The request amount r(ii) of the application ii is updated to a value resulting from subtracting m from r(ii). The request amount x (ii, jj) to be assigned to the application ii on the server jj is updated to a value resulting from subtracting m from x(ii, jj). The request amount x(ii, jj) to be assigned to the application ii on the server jj is updated to a value resulting from adding m to x (ii, jj).

In OP17, the control unit 15 sets a flag f (ii, j) (j is each of all the servers) of each of all of the servers jj to 1 for the application ii whose request amount r(ii) from the application ii becomes 0. If the request amount r(ii) from the application ii does not become 0, the processing in OP17 is omitted.

In OP18, the control unit 15 sets the flag f (i, jj) (i is each of all of the applications) of each of all of the application ii to 1 for the server jj whose capacity c(jj) of the server jj becomes 0. If the capacity c(jj) of the server jj does not become 0, the processing in OP18 is omitted. Subsequently, the processing proceeds to OP14, and the processing from OP14 is repeated.

In the second embodiment, request amounts to be assigned to respective servers are determined for each application by a heuristic algorithm. Results thereof are the same as those of the case where request amounts are assigned to respective servers for each application by linear programming. Therefore, the second embodiment also enables reduction in message forwarding between controllers while balancing processing loads between servers.

Also, use of a heuristic algorithm enables higher-speed calculation of request amounts to be assigned to respective servers for each application.

Third Embodiment

In the first embodiment, the capacity C of each server, which is one of the constraint conditions in the linear programming problem, is a constant having a value that is equal between servers, which is obtained by dividing a total sum of request amounts of all of the applications by the number of controllers. Also, in the second embodiment, the initial value of the capacity c(j) of each server j is a value that is equal between the servers, which is obtained by dividing request amounts of all of applications by the number of controllers. In the third embodiment, a tolerable margin is set for a capacity of a server. Note that in the third embodiment, description in common to the first embodiment and the second embodiment will be omitted. In the third embodiment, it is assumed that a system configuration, a hardware configuration and a functional configuration are the same as those of the first embodiment.

A constraint condition for a capacity of a server in the third embodiment is as follows.

[Expression 2]

$$\Sigma_{i=1}^{m} X_{ij} \leq C(1+\alpha)$$

$$\Sigma_{i=1}^{m} X_{ij} \geq C(1-\alpha) \quad \text{Constraint condition 1}$$

$\alpha$ is a coefficient representing a tolerable margin of an error. Note that expression of an error is not limited to a method in which an error is specified by a magnification factor relative to C, and for example, an error may be expressed by adding or subtracting a tolerable margin $\alpha$ to or from C.

FIG. 17 is a diagram indicating an example of capacities Cj of servers j according to the third embodiment. The premise in FIG. 17 is the same as that of the specific example of the first embodiment. For example, a capacity C1 of a server 1 is calculated as 40, and a capacity C2 of a server 2 is calculated as 35.

FIG. 18 is a diagram indicating an example of values of request amounts Xij to be assigned to applications i on servers j, which have been calculated by linear programming relative to the setting of the values of the capacities Cj of the server j in FIG. 17.

FIG. 19 is a diagram indicating an example of round-robin weights for a load balancing apparatus 3, which correspond to the values of the request amounts Xij to be assigned to the applications i on the servers j in FIG. 18.

FIG. 20 is a diagram indicating an example of message amounts for the server 1 and the server 2 where requests from each application are distributed to the server 1 and the server 2 using the weights Wij indicated in FIG. 19 when respective states of request amounts from the respective applications are in a same condition.

Where the weights Wij indicated in FIG. 19 are used, a total amount of indirect messages for all of the applications in the server 1 is 40, and a total amount of indirect messages for all of the applications in the server 2 is 30. In a specific example, a total of indirect message amounts in the server 1 and the server 2 is 30+30=70. For example, in comparison with the measurement results in the comparative example indicated in FIG. 13, a total of indirect message amounts in the measurement results in the comparative example is 110, it can be understood that the amount of messages forwarded between controllers has been reduced.

Therefore, according to the third embodiment, provision of a tolerable margin of error in capacity of servers enables more efficient reduction in amount of message forwarded between controllers (indirect message).

Also, although in the third embodiment, the example using linear programming according to the first embodiment has been described, the technique described in the third embodiment is applicable also to the case using a heuristic algorithm according to the second embodiment.

Variation of Third Embodiment

If a difference in performance between servers is known in advance, a capacity Cj may be varied according to the difference in performance between the servers. If the capacity Cj is varied according to the difference in performance between the servers, a constraint condition for a capacity of a server is as follows.

[Expression 3]

$$\Sigma_{i=1}^{m} X_{ij} \leq \alpha_j C, \alpha_j \geq 1 \quad \text{Constraint condition 1}$$

$\alpha_j$ is a coefficient representing performance of a server j. A value of a coefficient $\alpha_j$ of a server j with lowest performance is set as 1. Note that the constraint condition for a capacity of a server where the capacity Cj is varied according to a difference in performance between servers is not limited to the method in which the constraint condition is specified by a magnification factor relative to the capacity C of the servers. For example, the constraint condition for a capacity of a server where the capacity Cj is varied according to a difference in performance between servers may be expressed by addition or subtraction to or from the capacity C of the server.

Fourth Embodiment

In the first embodiment, the second embodiment and the third embodiment, an instance of an application i whose round-robin weight Wij for the load balancing apparatus 3 has been calculated as 0, but the instance continues operating on a server j even though no requests are input thereto. Resources on the server j are consumed by the instance of the application i to which no requests are input on the server j.

In a fourth embodiment, operation for an instance of an application i on a server j, whose calculated round-robin weight Wij for a load balancing apparatus 3 is less than a predetermined threshold value δ is stopped. In the fourth embodiment, description in common to the first embodiment, the second embodiment and third embodiment will be omitted. In the fourth embodiment, for a system configuration, a hardware configuration and a functional configuration, those that are the same as those of the first embodiment are assumed.

For example, in a case where round-robin weights Wij for the load balancing apparatus 3 in the example indicated in FIG. 11 are acquired and a threshold value δ=0.01, a control unit 15 makes determination to stop operation of instances of a DC#2 control application and a WAN control application on a server 1. The control unit 15 notifies the load balancing apparatus 3 of the weights Wij and the stoppage of the instances of the DC#2 control application and the WAN control application on the server 1 through a weight notification unit 17.

Figure 21:
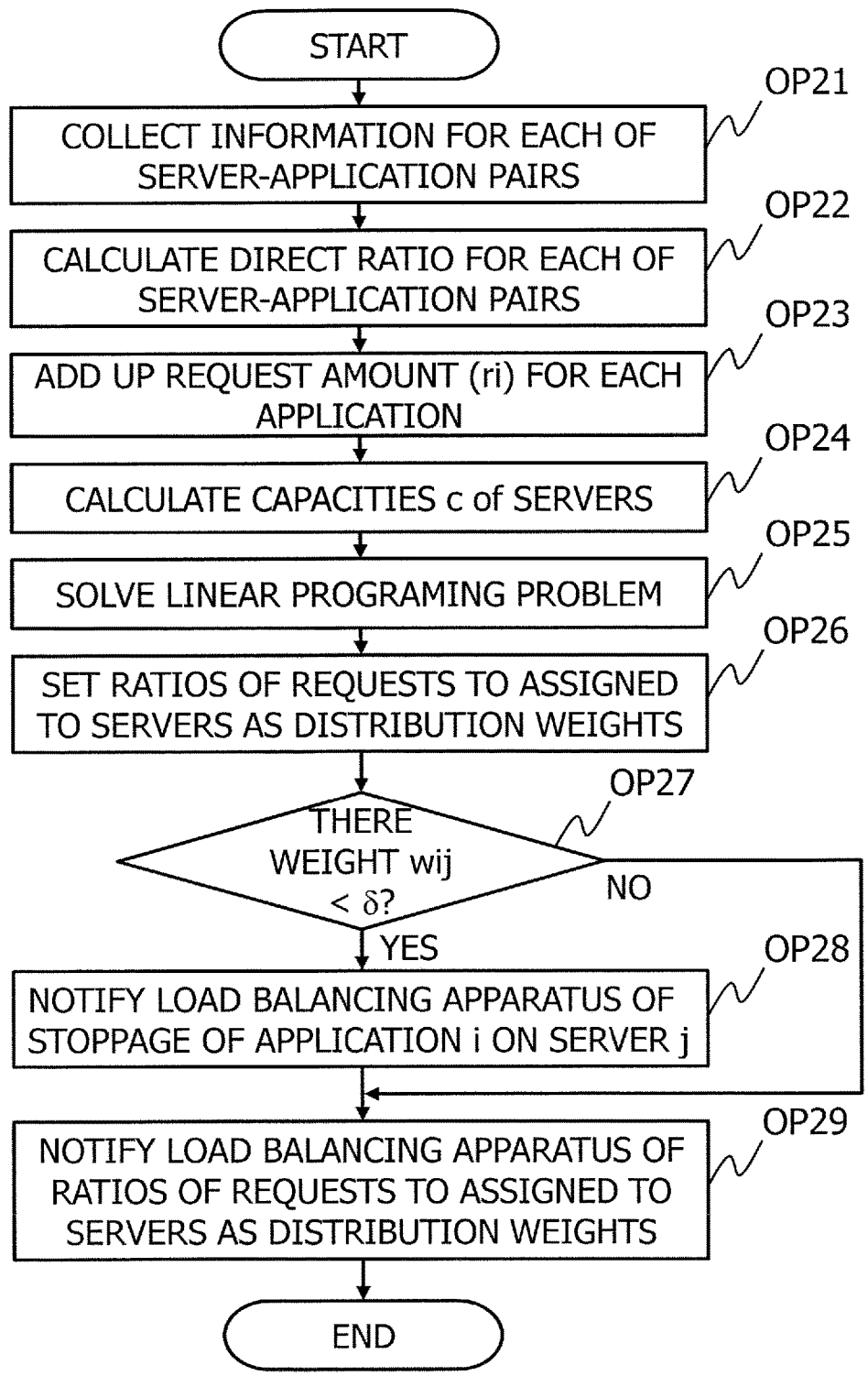
FIG. 21 is an example of a flowchart of processing for determining round-robin weights for a load balancing apparatus, by a control unit according to a fourth embodiment.
Figure 24:
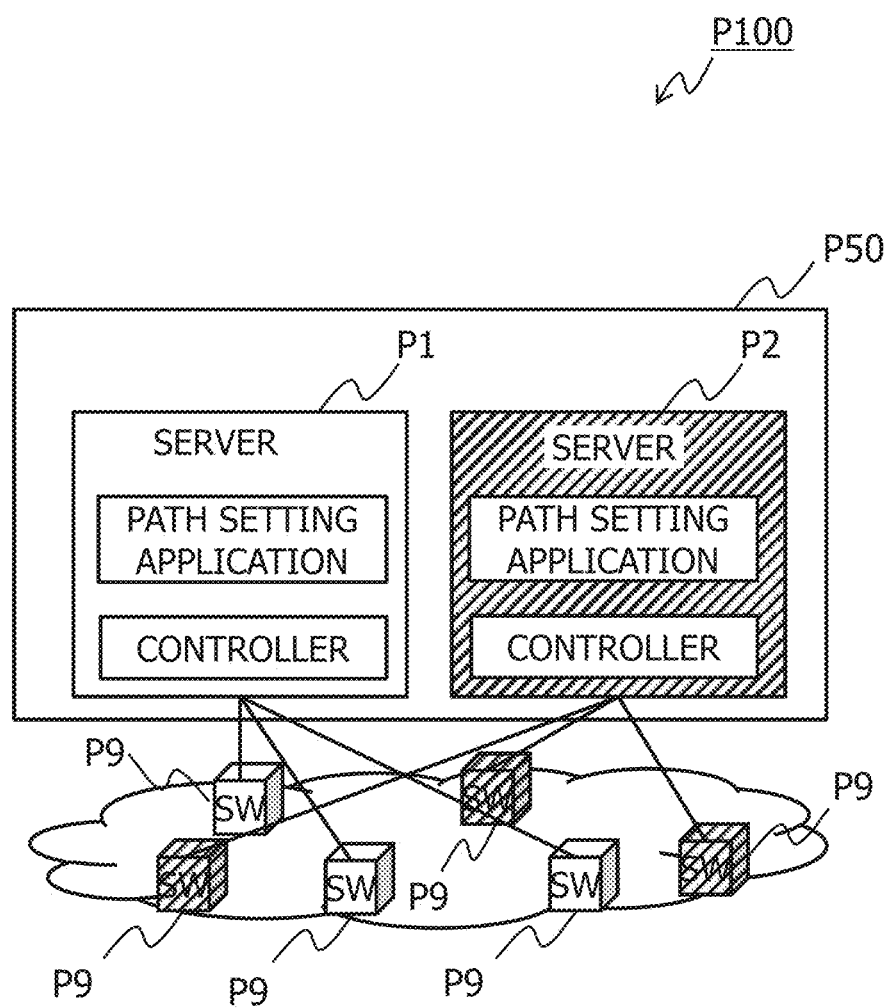
FIG. 24 is a diagram illustrating an example of a distributed-type communication control system.
Figure 25:
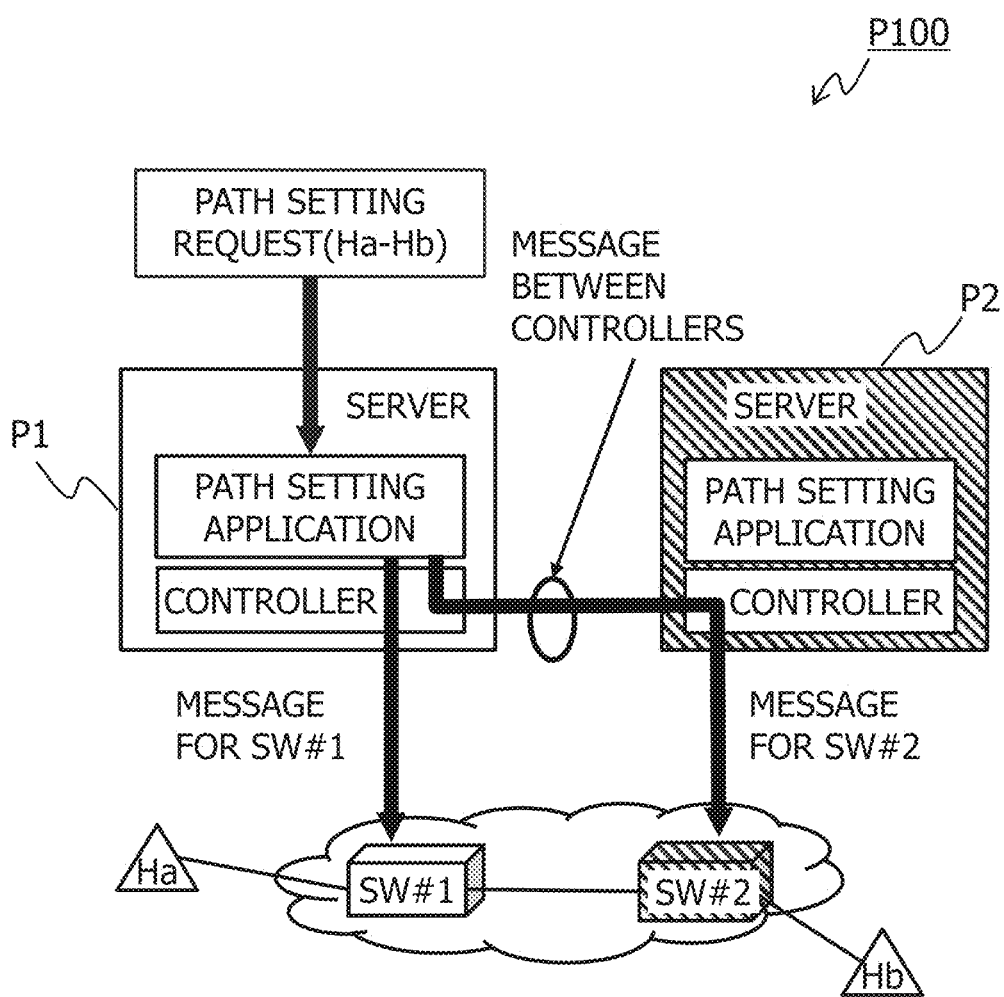
FIG. 25 is a diagram illustrating an example of a control message flow when a path setting request is input to a path setting application in the distributed-type communication control system.
Figure 26:
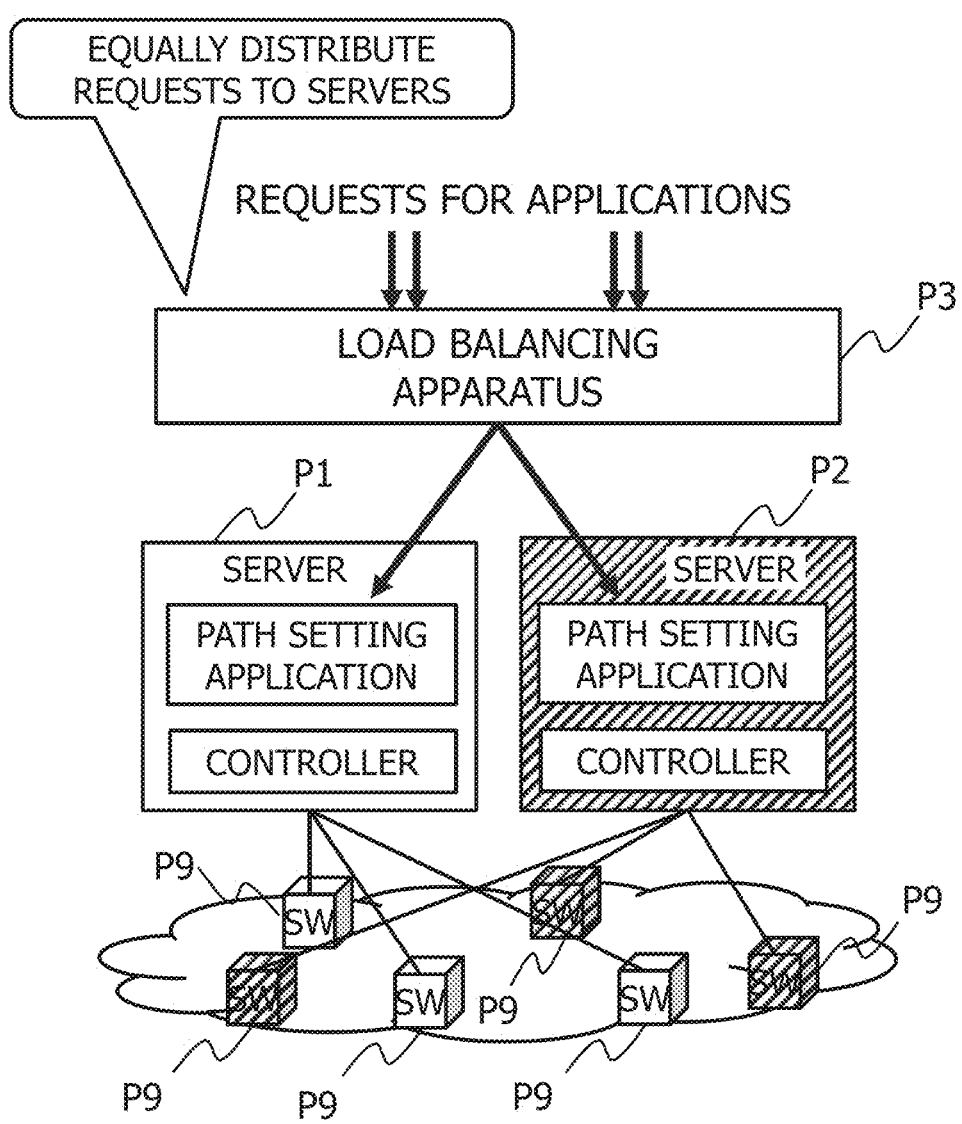
FIG. 26 is a diagram illustrating an example of a distributed-type communication control system including a load balancing apparatus.

FIG. 21 is an example of a flowchart of processing for determining round-robin weights for a load balancing apparatus 3, in processing by the control unit 15 according to the fourth embodiment. The processing indicated in FIG. 21 is repeated on a period that is the same as a period of an input of information on request amounts and message amounts for the server 1 and the server 2 to the control unit 15 of the server 1. Although an entity that performs the processing indicated in FIG. 21 is a CPU 101, for sake of convenience, the description will be provided with the control unit 15, which is a functional component, as the entity.

In OP21, the control unit 15 acquires a request amount, a direct message amount and an indirect message amount for each of combinations of a server and an application, from an information collecting unit 14.

In OP22, the control unit 15 calculates a direct ratio Aij for each of the combinations of a server and an application. In OP23, the control unit 15 calculates a generated request amount Ri for each application. In OP24, the control unit 15 calculates capacities C of the servers. In OP25, the control unit 15 solves a linear programming problem. In OP26, the control unit 15 calculates ratios of requests to be assigned to respective servers for each application, as round-robin weights Wij for the load balancing apparatus 3, from the request amounts to be assigned to the respective servers for each application, which have been obtained by solving the linear programming problem.

In OP27, the control unit 15 determines whether or not there is a weight Wij that is less than the threshold value δ. If there is a weight Wij that is less than the threshold value δ (OP27: YES), the processing proceeds to OP28. If there is no weight Wij that is less than the threshold value δ (OP27: NO), the processing proceeds to OP29.

In OP28, the control unit 15 notifies the load balancing apparatus 3 of the stoppage of an instance of an application i on a server j corresponding to the weight Wij that is less than the threshold value δ.

In OP29, the control unit 15 notifies the load balancing apparatus 3 of the round-robin weights Wij. Subsequently, the processing indicated in FIG. 21 ends.

In the fourth embodiment, if a calculated round-robin weight Wij for the load balancing apparatus 3 is less than the threshold value δ, operation of an instance of the relevant application i on the relevant server j is stopped. Consequently, consumption of resources of the server j can be reduced.

Also, although in the fourth embodiment, the case where the fourth embodiment is applied to the first embodiment has been described, the present invention is limited to the case, and the technique described in the fourth embodiment is applicable also to the second embodiment and the third embodiment.

Fifth Embodiment

In the fifth embodiment, round-robin weights for a load balancing apparatus 3 are determined so that requests from each application are assigned to a server having a highest direct ratio for the application.

FIG. 22 is a diagram illustrating an example of a server having a highest direct ratio for each application according to a fifth embodiment. The drawing illustrated in FIG. 22 is an example of a case where direct ratios of respective servers for respective applications have the values indicated in FIG. 7. A control unit 15 calculates direct ratios of respective servers for each application and then selects a server having a highest direct ratio for each application. If there are a plurality of servers having a highest direct ratio, for example, the control unit 15 randomly selects any of the servers.

In FIG. 7, a server having a highest direct ratio in a DC#1 control application is a server 1, and thus, in FIG. 22, the server 1 is selected. In FIG. 7, a server having a highest direct ratio in a DC#2 control application is a server 2, and thus, in FIG. 22, the server 2 is selected. In FIG. 7, in a WAN control application, both the direct ratios of the server 1 and the server 2 have a same value of 1/2, and thus, in FIG. 22, as a result of random selection, the server 1 is selected.

Therefore, in FIG. 22, it is indicated that requests from the DC#1 control application are all distributed to the server 1. It is indicated that requests from the DC#2 control application are all distributed to the server 2. It is indicated that requests from the WAN control application are all distributed to the server 1.

FIG. 23 is a diagram indicating an example of message amounts in the server 1 and the server 2 in a comparative example and message amounts in the server 1 and the server 2 when requests are distributed to the server indicated in FIG. 22 for each application, where respective states of request amounts for each application are in a same condition. The comparative example in FIG. 23 is an example of a case where requests are equally distributed to the server 1 and the server 2, which is the same as the comparative example in FIG. 13.

Where requests are distributed to the server indicated in FIG. 22 for each application, a total amount of indirect messages for all of the applications in the server 1 is 50, and a total amount of indirect messages for all of the applications in the server 2 is 20. In the specific example, a total of the indirect message amounts in the server 1 and the server 2 is 50+20=70. Since a total of the indirect message amounts in the server 1 and the server 2 in the comparative example is 110, in the fifth embodiment, it is indicated that message forwarding between controllers is reduced.

Therefore, according to the fifth embodiment, assignment of all of requests to a server having a highest direct ratio for each application enables reduction in amount of messages forwarded between controllers (indirect message).

<Others>

A round-robin weight for a load balancing apparatus 3 may be a ratio of the number of switches for which each controller serves as a master in an entire distributed-type communication control system 100. In this case, for example, a control unit 15 calculates a ratio of switches for which each server serves as a master, from master information, and notifies the load balancing apparatus 3 of the calculated ratios. Consequently, a larger number of requests can be distributed to a controller serving as a master for a larger number of switches. Also, in this case, an imbalance of controllers each serving as a master for switches that are setting objects for an application is not taken into consideration.

Sixth Embodiment

In the sixth embodiment, an imbalance is made to occur in the number of switches 9 for which each controller serves as a master in switches 9 within a set region for an application by changing a controller serving as a master of a switch 9 to another controller. In the sixth embodiment, description overlapping those of the first to fifth embodiments will be omitted.

For example, in the distributed-type communication control system 100 in FIG. 4, within a set region for a WAN control application, there are two switches for which a server 1 serves as a master and two switches for which a server 2 serves as a master. In this case, within the set region for the WAN control application, there is no imbalance in the number of switches for a controller serves as a master between the server 1 and the server 2.

Where there is no imbalance in the number of switches 9 for which each controller serves as a master, regardless of how round-robin weights for the WAN control application are set for the load balancing apparatus 3, a controller-to-controller message reduction effect provided by the round-robin weights is small. This is because, for example, if it is assumed that messages are equally transmitted to the respective switches 9, irrespective of values of the round-robin weights, an amount of messages according to the amounts of requests distributed to the respective controllers is equally divided between the controllers.

In the sixth embodiment, a master for a group of switches is intentionally unbalanced for a particular controller, and the controller-to-controller message reduction effect increased. However, in the system, a plurality of applications are in operation. Thus, in sixth embodiment, a switch that is an object of changing a master is determined so that a total amount of controller-to-controller messages for all of the applications is reduced.

Also, even though the amount of controller-to-controller messages is reduced by change of a master for a switch 9, if processing of messages is concentrated on a particular controller, a load on the controller increases. In this case, operation of the entire system may be lowered. Therefore, in the sixth embodiment, a switch that is an object of changing a master and a master for the switch after the change are determined so as to equalize loads on the controllers.

More specifically, a switch 9 that is an object of changing a master and a master for the switch 9 after the change are determined so as to equalize the number of messages transmitted from each controller to switches 9 and furthermore, equalize an amount of request amounts distributed to each controller.

In the sixth embodiment, the server 1 determines a switch that is an object of changing a master and a master for the switch after the change. However, the one that determines a switch that is an object of changing a master and a master for the switch after the change is not limited to the server 1, and may be either the server 2 or the load balancing apparatus 3.

In the sixth embodiment, a system configuration of the distributed-type communication control system 100 and a hardware configuration and a functional configuration of the server 1 are similar to those of the first embodiment. However, the technique described in the sixth embodiment is applicable also to the servers 1 in the second to fifth embodiments.

In the sixth embodiment, a control unit 15 of the server 1 determines a switch 9 that is an object of changing a master and a master for the switch 9 after the change. More specifically, the control unit 15 calculates round-robin weights Wij for a load balancing apparatus 3, for each of case examples of a combination of one or more switches 9 that is an object of changing a master and a master after the change from all of the switches in the system and simulates distribution of requests from each application according to the calculated weights Wij. As a result of the simulation, a controller-to-controller message amount and an imbalance in amount of messages transmitted from a controller to switches 9 between the controllers are obtained.

The simulation is performed based on information on a generated request amount and messages transmitted to the switches 9 for each application within a predetermined period. The above information used for the simulation is collected by the other controllers and an information collecting unit 14.

The control unit 15 selects a case example in which the controller-to-controller message amount is small from among case examples in which the imbalance in amount of messages transmitted from a controller to the switches 9 between the controllers is smaller than a predetermined threshold value, from the simulation results. The control unit 15 determines a switch 9 that is an object of changing a master and a master of the switch 9 after the change based on the selected case example. Processing for determining a switch that is an object of changing a master and a master for the switch 9 after the change is hereinafter referred to as "master change determination processing".

<Details of Master Change Determination Processing>

Figure 27:
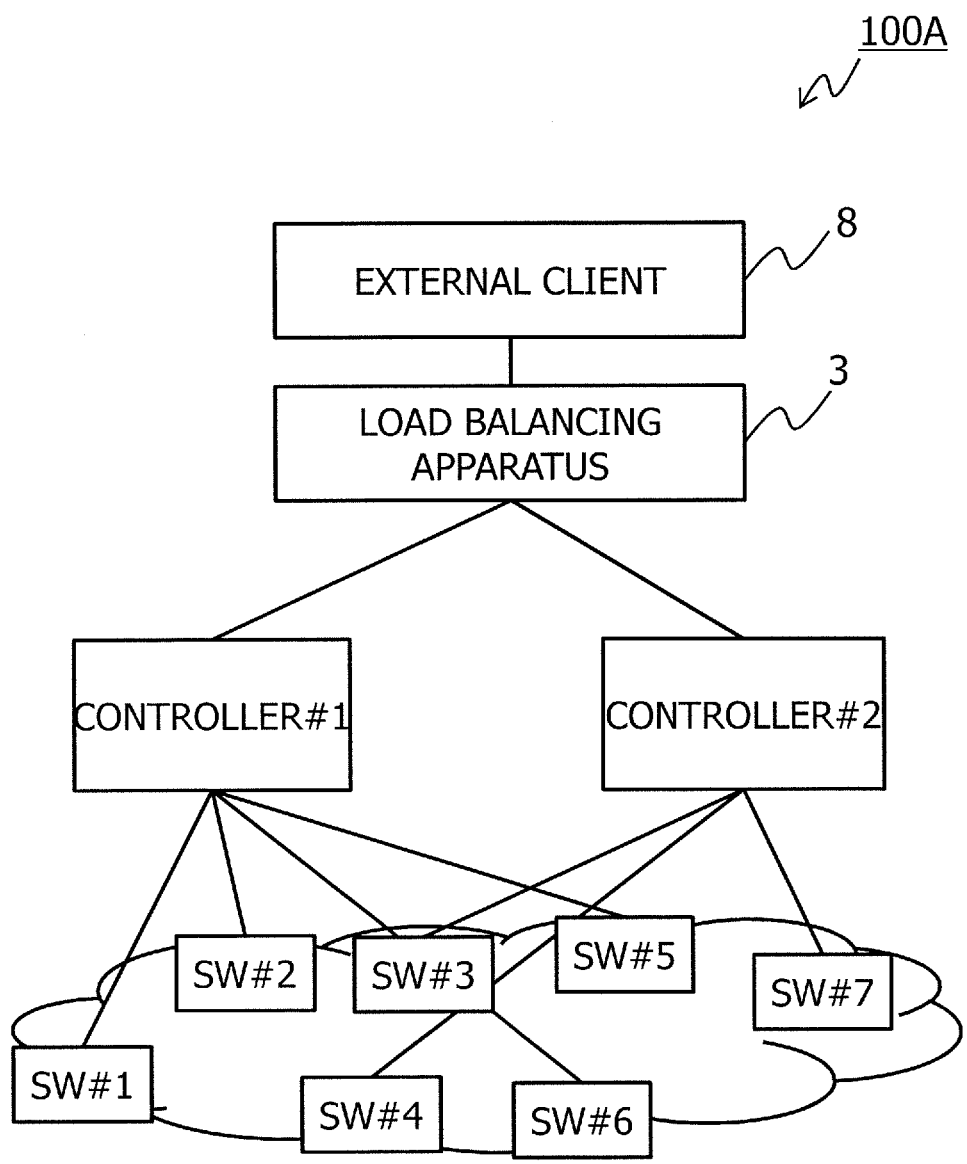
FIG. 27 is a diagram illustrating an example of a distributed-type communication control system assumed in a specific example according to a sixth embodiment.

FIG. 27 is a diagram illustrating an example of a distributed-type communication control system 100A assumed in a specific example according the sixth embodiment. The distributed-type communication control system 100A according to the specific example includes two controllers #1 and #2. Also, the distributed-type communication control system 100A includes seven switches #1 to #7.

It is assumed that controller #1 and controller #2 are instances existing in the server 1 and the server 2, respectively. Also, it is assumed that there is instances of application #1 and application #2 in each of the server 1 and the server 2 with controller #1 and controller #2 installed therein, respectively. Hereinafter, the terms "server" and "controller" will be used with no distinction. For example, what is referred to as controller #1 indicates the server 1. What is referred to as server 1 indicates controller #1.

Also, in the specific example of the sixth embodiment, it is assumed that the server 1, that is, the server 1 with controller #1 installed therein performs master change determination processing. Master change determination processing is processing for determining a switch 9 that is an object of changing a controller serving as a master therefor and a master for the switch 9 after the change. However, an apparatus that performs master change determination processing is not limited to the server 1 and may be either the server 2 or the load balancing apparatus 3.

FIG. 28 is an example of master information according to the specific example of the sixth embodiment. In the master information, information on a controller serving as a master for each switch in the distributed-type communication control system 100A is stored. The master information is stored in a master information storage unit 18C in the server 1. The master information may be set in advance by a manager of the distributed-type communication control system 100A or may be acquired by negotiation between controllers.

In FIG. 28, controller #1 and controller #2 are represented by C#1 and C#2, respectively. Switch #1 to switch #7 are represented by SW#1 to SW#7, respectively. The same applies to the subsequent drawings.

In the distributed-type communication control system 100A according to the specific example, switches for which controller #1 serves as a master are switches #1, #2, #5 and #6. Switches 9 for which controller #2 serves as a master are switches #3, #4 and #7.

In the master change determination processing according to the specific example, it is assumed that the number of switches for which a master is to be changed in the distributed-type communication control system 100A is limited to one. However, the number of switches for which a master is to be changed is not limited to one, and a master change may be made for a plurality of switches.

(Step 1)

For each of all of case examples of a combination of a selected switch that is an object of changing a master and a master for the selected switch after the change, the control unit 15 of the server 1 creates a master change information piece indicating the case example, based on the current master information. In the specific example, it is assumed that there are two controllers, and seven switches, one of which is an object of changing a master, and thus, seven master change information pieces, (switch count)×(controller count−1)=7×1=7, are created. The master change information pieces are an example of "case example information pieces". The processing in step 1 is an example of "create[ing] a plurality of case example information pieces each indicating a case example in which one or more destination apparatuses are selected from the plurality of destination apparatuses".

FIG. 29 is a diagram indicating an example of master change information pieces according to the specific example of the sixth embodiment. The master change information pieces are information pieces relating to case examples of a combination of a selected switch 9 that is an object of changing of a controller serving as a master therefor and a master for the selected switch 9 after the change. In the example indicated in FIG. 29, each master change information piece includes identification information of the master change information piece, identification information of a switch 9 that is an object of changing a master and identification information piece of a controller serving as a master for the switch 9 after the change.

In the example indicated in FIG. 29, in master change information piece #1, the switch 9 that is an object of changing a master is switch #1 and the master for switch #1 after the change is controller #2. In master change information piece #2, the switch 9 that is an object of changing a master is switch #2, and the master for switch #2 after the change is controller #2. In master change information piece #3, the switch 9 that is an object of changing a master is switch #3, and the master for switch #3 after the change is controller #1. In master change information piece #4, the switch 9 that is an object of changing a master is switch #4, and the master for switch #4 after the change is controller #1. In master change information piece #5, the switch 9 that is an object of changing a master is switch #5, and the master for switch #5 after the change is controller #2. In master change information #6, the switch 9 that is an object of changing a master is switch #6, and the master for switch #6 after the change is controller #2. In the master change information #7, the switch 9 that is an object of changing a master is switch #7, and the master for switch #7 after the change is controller #1.

For example, if settings are made so that there are two controllers and the number of switches that is an object of changing a master is two at most, a number of master change information pieces, the number being the number of combinations of two switches 9 selected from the seven switches 9 (21 different combinations), are created in addition to the master change information pieces indicated in FIG. 29. Note that the master change information pieces are temporarily held in a storage area in a main storage device 102, and deleted upon an end of the master change determination processing.

(Step 2)

For each of the master change information pieces obtained in step 1, the control unit 15 of the server 1 simulates distribution of requests from an application for a case where the master change information piece is applied, that is, the master of the switch 9 that is an object of changing a master is changed to the controller indicated by the master change information piece. As a result of the simulation, the control unit 15 acquires, for example, a controller-to-controller message amount and a variance value of amounts of messages transmitted from the controllers to the switches 9. A procedure of the simulation is as follows. An index value indicating a variation of amounts of messages from the controllers to the switches 9, such as a variance value, a standard deviation or a difference between a largest value and a smallest value, is an example of "an index value indicating a variation, between the plurality of control apparatuses, of respective message amounts transmitted from the plurality of control apparatuses to the destination apparatuses controlled by the plurality of control apparatuses".

(Step 2-1)

The control unit 15 of the server 1 acquires switch lists. A switch list is a list of switches set within a predetermined period by an application. A switch set by an application is, for example, a switch that is a destination of a message created by a controller according to a request from the application. Or, a switch set by an application is, for example, a switch that receives a message created by a controller according to a request from the application.

FIG. 30 is a diagram indicating an example of switch lists according to the specific example of the sixth embodiment. In the specific example, it is assumed that there are two applications, and thus in FIG. 30, switch lists for application #1 and application #2 are indicated.

One identification information piece of a switch by one message is included in a switch list, the message created by a controller according to a request from a relevant application and transmitted to the switch 9. An identification information piece of a switch included in a switch list is an identification information piece of a switch that is a destination of a message created by a controller according to a request from a relevant application. For example, in the example indicated in FIG. 30, SW#1, SW#1, SW#5, SW#4 . . . are stored in the switch list for application #1. This indicates that in application #1, a message transmitted to SW#1, a message transmitted to SW#1, a message transmitted to SW#5 and a message transmitted to SW#4 have been generated.

From among the information pieces of the switches which are destinations of messages included in the switch list for each application, information pieces of switches which are destinations of messages regarding the own controller is, for example, accumulated in a message amount storage unit 18B. The information pieces of switches which are destinations of messages regarding the own controller is information of switches 9 that are destinations of messages transmitted by the own controller. The information collecting unit 14 reads the information pieces of switches which are destinations of messages regarding the own controller from the message amount storage unit 18B and outputs the information pieces to the control unit 15.

From among the information pieces of switches which are destinations of messages for each application, information pieces of switches which are destinations of messages regarding each of other controllers is, for example, acquired by reception from the other controller through a measurement result receiving unit 16. The information pieces of switches which are destinations of messages regarding each of the other controllers are information pieces of switches 9 that are destinations of transmission of messages transmitted by the other controller. Note that the switch lists are temporarily held in the storage area of the main storage device 102, and deleted upon an end of the master change determination processing.

An identification information piece of a switch included in a switch list is an information piece indicating a destination of transmission of one message and corresponds to one message. Therefore, it can be considered that a switch list includes information on messages created according to a request from the relevant application. Thus, hereinafter, elements (identification information pieces of switches) included in a switch list may be expressed as messages.

(Step 2-2)

The control unit 15 of the server 1 calculates a direct ratio $A_{ij}$ for each of all of the combinations of a server j and an application i. In the sixth embodiment, the direct ratio $A_{ij}$ is calculated in a manner that is similar to that of the first embodiment.

FIG. 31 is a diagram indicating an example of direct ratios $A_{ij}$ for applications i in controllers j according to the specific example of the sixth embodiment. In the specific example, there are two controllers and two applications, and thus, the direct ratios $A_{ij}$ form a matrix of 2×2.

In the example indicated in FIG. 31, a direct ratio $A11$ for application #1 in controller #1 is 1/4. A direct ratio $A12$ for application #1 in controller #2 is 3/4. A direct ratio $A21$ for application #2 in controller #1 is 3/5. A direct ratio $A22$ for application #2 in controller #2 is 2/5.

(Step 2-3)

The control unit 15 of the server 1 calculates round-robin weights $W_{ij}$ for the load balancing apparatus 3, the weights providing a smallest controller-to-controller message amount, based on a generated request amount for each application within a predetermined period and the direct ratios $A_{ij}$. The generated request amount for each application within a predetermined period is acquired from the information collecting unit 14. The round-robin weights $W_{ij}$ for the load balancing apparatus 3 are calculated in a manner that is similar to that of the first embodiment or the second embodiment. The processing in step 2-3 is an example of "determine[ing] the weights for a case where a control apparatus controlling the selected one or more destination apparatuses is changed to another control apparatus, for each of the plurality of case example information pieces created".

FIG. 32 is a diagram indicating an example of generated request amounts for applications according to the specific example of the sixth embodiment. In the specific example, it is assumed that a generated request amount for application #1 is 20. It is assumed a generated request amount for application #2 is 10.

FIG. 33 is an example of round-robin weights $W_{ij}$ for the load balancing apparatus 3 according to the specific example of the sixth embodiment. In the specific example, for application #1, a weight $W11$ of controller #1 is 1/4, and a weight $W12$ of controller #2 is 3/4. For application #2, a weight $W21$ of controller #1 is 1, and a weight $W22$ of controller #2 is 0.

(Step 2-4)

The control unit 15 of the server 1 simulates distribution of requests from each application for a case where the respective master change information pieces are applied, using the switch lists and the round-robin weights $W_{ij}$ for the load balancing apparatus 3. For example, the simulation is performed as follows.

For application i, the control unit 15 acquires a controller k (k: positive integer not including 0) that is a master of a switch 9 that is a destination of an object message in a switch list based on the relevant master change information piece and the master information. In other words, the controller k that is a master of a switch 9 that is a destination of the object message is acquired based on the master information after change where the master change information piece is applied. Irrespective of which controller created the object message, the object message is transmitted from the controller k that is the master to the switch 9 that is the destination. Therefore, since the object message in the switch list is a message transmitted from the controller k to switch 9, the control unit 15 increments a transmitted message amount $CM_{ik}$ of message transmitted from the controller to switches 9 by 1.

The control unit 15 generates a random number using a round-robin weight $W_{ik}$ of the controller k for the application i and selects a controller j that is a destination of request distribution by the load balancing apparatus 3, using the generated random number.

If the controller k and the controller j do not correspond to each other, it is indicated that a request that is a cause of creation of the message is distributed to a controller other than the controller k by the load balancing apparatus 3. Since the master of the object message is the controller k, the object message is created by the distribution destination controller j (j≠k) and transmitted to the master controller k, and transmitted from the master controller k to the destination switch 9. Therefore, if the controller k and the controller j do not correspond to each other, the object message is a controller-to-controller message, and the control unit 15 increments a controller-to-controller message amount interMsgs by 1.

Here, if the controller k and the controller j correspond to each other, it is indicated that the request that is a cause of creation of the object message is distributed to the controller k by the load balancing apparatus 3. Since the master of the object message is the controller k, the object message is created by the distribution destination controller j (j=k) and transmitted to the destination switch 9. In this case, no controller-to-controller message is generated, and thus, the controller-to-controller message amount interMsgs is not updated.

The control unit 15 of the server 1 performs the above processing for each of all of messages included in the switch list for each application. Upon the above processing being performed for each of all of messages included in the switch list for each application, the control unit 15 calculates a variance value of transmitted message amounts of messages transmitted from the controllers to the switches 9, based on the transmitted message amount CMik of messages transmitted from the controller k to the switch 9. A method for calculating the variance value may be any of known methods.

Note that a value indicating an imbalance of the transmitted message amounts of messages transmitted from the controllers to the switches 9 is not limited to a variance value. As a value indicating an imbalance in directly transmitted message amount between the controllers, for example, a standard deviation or a difference between a largest value and a smallest value may be used.

The control unit 15 performs simulation of each of all of cases where each master change information piece is applied, to calculate the controller-to-controller message amount interMsgs and the variance value of the transmitted message amounts of messages transmitted from the controllers to the switches 9. The processing in step 2-4 is an example of "simulate[ing] distribution of requests for the predetermined processing based on the determined weights to acquire an amount of messages forwarded between the plurality of control apparatuses, and an index value indicating a variation, between the plurality of control apparatuses, of respective message amounts transmitted from the plurality of control apparatuses to the destination apparatuses controlled by the plurality of control apparatuses".

(Step 3)

The control unit 15 of the server 1 selects a master change information piece to be employed, based on results of the simulation. More specifically, for example, the control unit 15 employs a master change information piece that provides a smallest controller-to-controller message amount from among master change information pieces whose variance value of the transmitted message amounts of messages transmitted from the controllers to the switches 9 is not more than a threshold value. Upon determination of the master change information piece to be employed, the switch 9 that is an object of changing a master included in the relevant master change information piece is selected as a switch that is an object of changing a master.

Employment of a master change information piece that provides a smallest controller-to-controller message amount from among master change information pieces whose variance value of the transmitted message amounts of messages transmitted from the controllers to the switches 9 is not more than a threshold value is an example of "a condition including an amount of messages forwarded between the plurality of control apparatuses being reduced and respective amounts of message transmitted from the plurality of control apparatuses to the plurality of destination apparatuses controlled by the plurality of control apparatuses being equal to each other". The variance value of the transmitted message amounts of messages transmitted from the controllers to the switches 9 being not more than a threshold value is an example of "respective amounts of message transmitted from the plurality of control apparatuses to the plurality of destination apparatuses controlled by the plurality of control apparatuses being equal to each other".

The processing in step 3 is an example of "extracts a case example information piece that provides a smallest amount of messages forwarded between the controllers from among case example information pieces each providing an index value that is not more than a predetermined threshold value, the index value indicating the variation, and makes determination to change a control apparatus controlling one or more destination apparatuses selected in the extracted case example information to another control apparatus".

FIG. 34 is a diagram indicating an example of simulation results according to the specific example of the sixth embodiment. For example, it is assumed that the threshold value of the variance value of the transmitted message amounts of messages transmitted from the controllers to the switches 9 is 5.

In the case of the example indicated in FIG. 34, the control unit 15 extracts master change information pieces #1, #2, #5, #6 and #7 whose variance value of the transmitted message amounts of messages transmitted from the controllers to the switches 9 is not more than the threshold value (5). Next, the control unit 15 selects master change information piece #2 whose controller-to-controller message amount is 10, that is, smallest, from among the master change information pieces #1, #2, #5, #6 and #7. In other words, the control unit 15 determines switch #2 as the switch that is an object of changing a master.

FIG. 35 is a diagram indicating an example of master information after application of master change information piece #2 according to the specific example of the sixth embodiment. Master change information piece #2 indicates that the master of the switch #2 is changed from controller #1 to controller #2. Therefore, the control unit 15 updates the master information in the master information storage unit 18C to that with the master of switch #2 changed from controller #1 to controller #2.

Also, the control unit 15 notifies, for example, the other controller of master change information piece #2. The other controller is notified of the master change information piece through, for example, a controller-to-controller interface unit, which is a functional component not illustrated in FIG. 3. The controller that has received the master change information piece updates the master information according to the master change information piece. This is an example of a method for keeping consistency of the master information between the controllers in the system.

<Flow of Processing>

Figure 36:
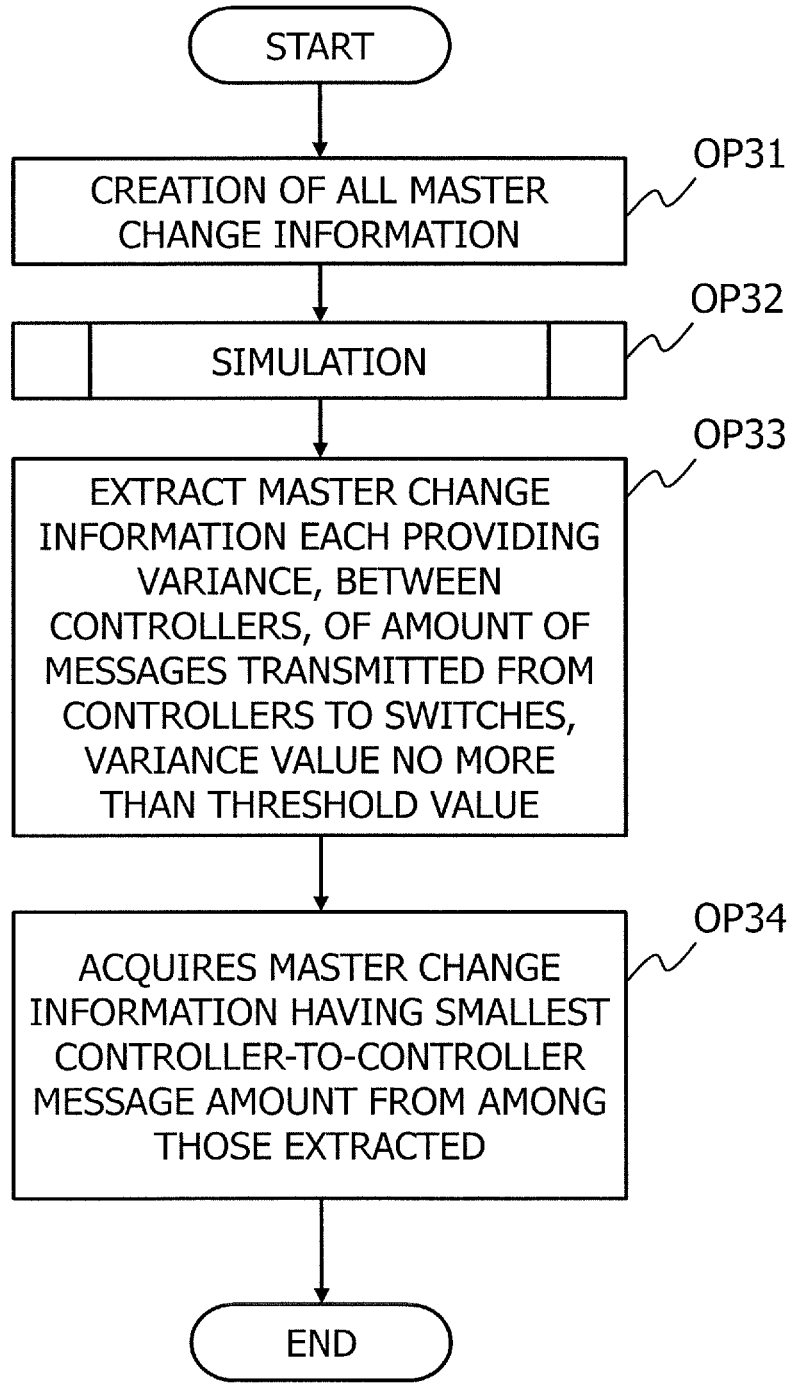
FIG. 36 is an example of a flowchart of master change determination processing according to the sixth embodiment.

FIG. 36 is an example of a flowchart of master change determination processing according to the sixth embodiment. The processing indicated in FIG. 36 may be performed, for example, on a predetermined period or may be performed upon being triggered by occurrence of a predetermined event. The event serving as a trigger for performing the processing indicated in FIG. 36 is, for example, an imbalance in direct ratio Aij between the controllers becoming less than a threshold value for an application i. Although an entity that performs the example indicated in FIG. 36 is the CPU 101 of the server 1, for sake of convenience, the description will be provided with the control unit 15, which is a functional component, as the entity.

In OP31, the control unit 15 creates a master change information piece for each of all of combinations of a switch 9 that is an object of changing a master and a master of the switch 9 after the change. For example, if there are two controllers and the master of one switch 9 of seven switches is changed, seven master change information pieces are created. If there are two controllers and the respective masters of two switches 9 of seven switches are changed, 21 master change information pieces are created.

In OP32, the control unit 15 performs simulation of cases where each of all master change information pieces is applied. As a result of the simulation, a controller-to-controller message amount interMsgs and a variance value of an amount of messages transmitted from the controllers to the switches 9 for each of the cases where each of all of the master change information pieces is applied. Details of processing in the simulation will be described later.

In OP33, the control unit 15 extracts master change information pieces each providing a variance value of the transmitted message amount of messages transmitted from the controllers to the switches 9, the variance value being no more than a threshold value, from the simulation results.

In OP34, the control unit 15 acquires a master change information piece providing a smallest controller-to-controller message amount from among the master change information pieces extracted in OP33, as a master change information piece to be employed. The control unit 15 determines the switch 9 that is an object of changing a master in the acquired master change information piece, as a switch that is an object of changing a master. Subsequently, the processing indicated in FIG. 36 ends.

Here, in OP33, if there is no master change information piece providing a variance value of transmitted message amounts of messages transmitted from the controller to the switch 9, the variance value being not more than the threshold value, it may be determined that none of the masters of the switches 9 is changed. Or, a master change information piece providing a smallest variance value of the transmitted message amount of messages transmitted from the controllers to the switches 9 may be selected.

Also, instead of the processing in OP33 and OP34, the control unit 15 may perform the following processing. For example, the control unit 15 selects a master change information piece providing a smallest controller-to-controller message amount from the simulation results. Next, the control unit 15 determines whether or not the variance value of transmitted message amounts of messages transmitted from the controllers to the switches 9 in the selected master change information piece is not more than the threshold value.

If the variance value of transmitted message amounts of messages transmitted from the controllers to the switches 9 in the selected master change information piece is not more than the threshold value, the control unit 15 acquires the selected master change information piece as a master change information piece to be employed. If the variance value of transmitted message amounts of messages transmitted from the controllers to the switches 9 in the selected master change information piece is larger than the threshold value, the control unit 15 selects a master change information piece providing a second smallest controller-to-controller message amount and performs processing similar to the above.

The processing in OP31 in FIG. 36 corresponds to (step 1) in the master change determination processing. The processing in OP32 in FIG. 36 corresponds to (step 2) in the master change determination processing. The processing in OP33 and OP34 in FIG. 36 corresponds to (step 3) in the master change determination processing.

Figure 37A:
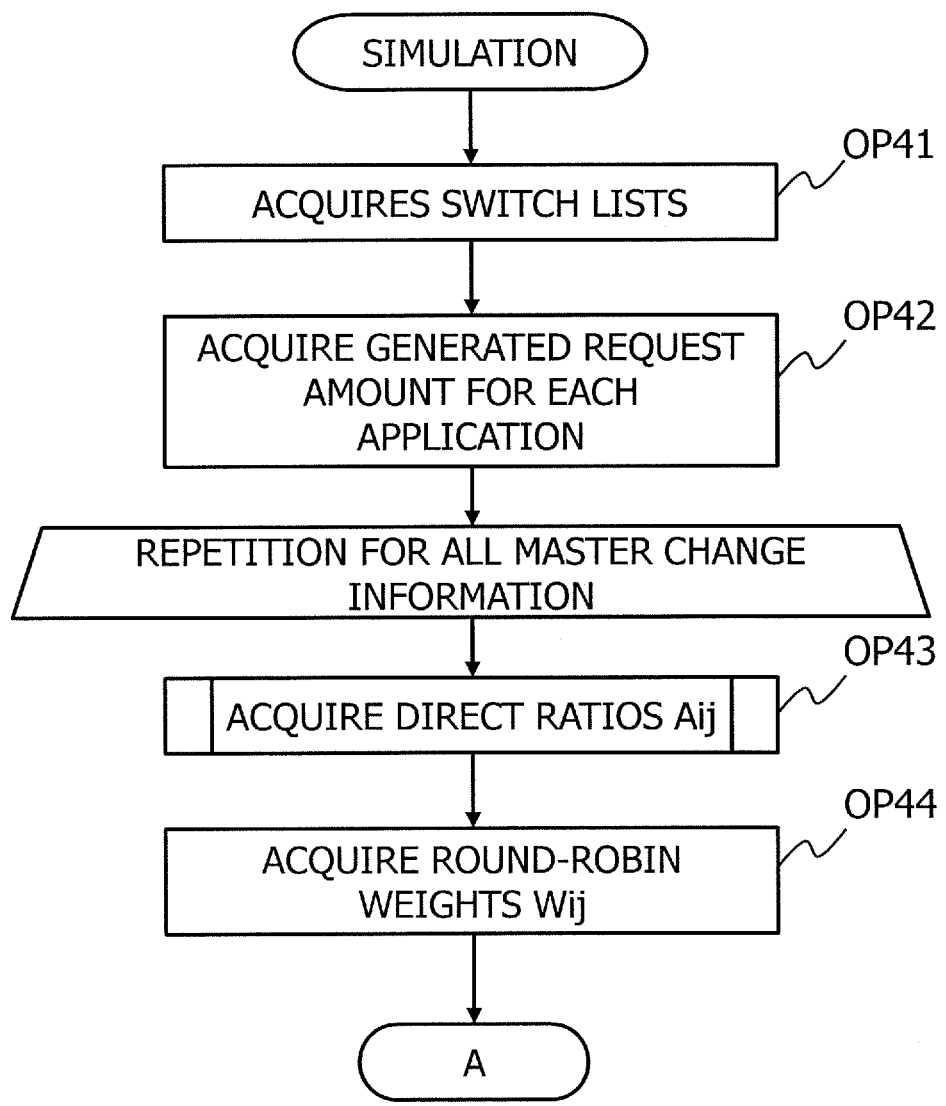
FIG. 37A is an example of a flowchart of simulation processing.
Figure 37B:
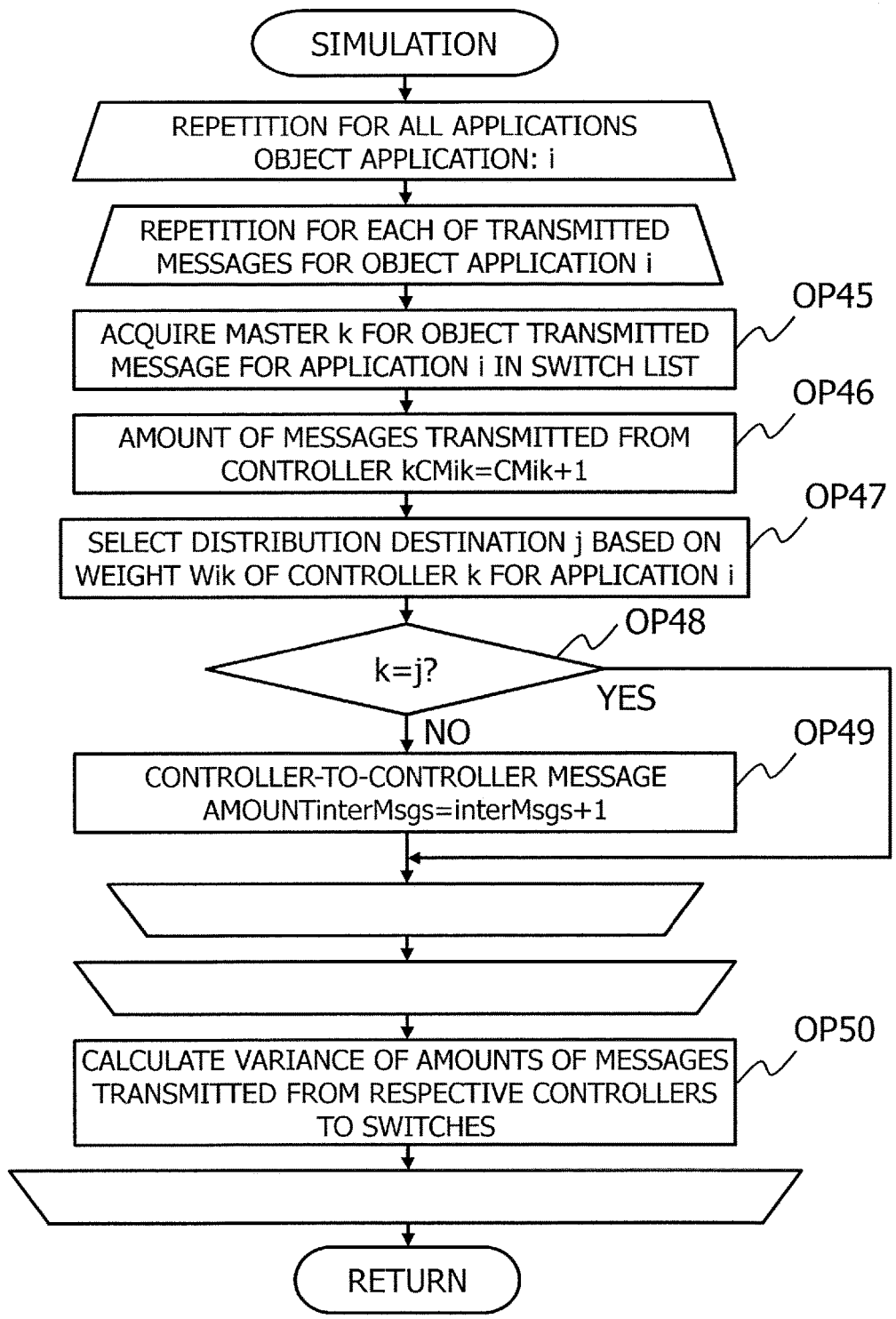
FIG. 37B is an example of a flowchart of simulation processing.

FIGS. 37A and 37B provide an example of a flowchart of simulation processing. The processing indicated in FIGS. 37A and 37B is processing performed in OP32 in FIG. 36. Although an entity of performance in the example indicated in FIGS. 37A and 37B is the CPU 101 of the server 1, for sake of convenience, the description will be provided with the control unit 15, which is a functional component, as the entity. The processing indicated in FIGS. 37A and 37B is performed based on messages transmitted to the switches 9 according to requests from the applications, the requests being generated in a predetermined period.

In OP41, the control unit 15 acquires a switch list for each application. The switch lists are acquired, for example, from information received from the other controller through the measurement result receiving unit 16, and information stored in the message amount storage unit 18B.

In OP42, the control unit 15 acquires a generated request amount for each application. The generated request amount for each application is acquired by the control unit 15 referring to an application request amount storage unit 18A.

The processing in OP43 to OP50 is repeated for each master change information piece. In OP43, the control unit 15 acquires direct ratios $A_{ij}$ of all of the controllers j for all of applications i. The direct ratios $A_{ij}$ are calculated, for example, in a manner that is similar to that of the first embodiment.

In OP44, the control unit 15 acquires round-robin weights $W_{ij}$ for the load balancing apparatus 3 for all of the applications i for all of the controllers j. The round-robin weights $W_{ij}$ for load balancing apparatus 3 are calculated in a manner that is similar to that of any of the first to fifth embodiments.

The processing in OP45 to OP49 in FIG. 37B is repeated for each of all of the applications. Also, the processing in OP45 to OP49 in FIG. 37B is repeated a number of times, the number corresponding to the number of switches that are destinations of messages included in the switch list for one application. In other word, the processing in OP45 to OP49 in FIG. 37B is repeated a number of times, the number corresponding to (the number of messages included in the switch list for one application)×(the number of applications)×(the number of master change information pieces).

Hereinafter, it is assumed that a processing object application is an application i. A message that is a processing object in the switch list for the application i is referred to as an object message.

In OP45, the control unit 15 acquires a controller k that is a master of a switch 9 that is a destination of the object message in the switch list for the application i, based on the relevant master change information piece and the master information. In other words, the controller k that is a master of a switch 9 that is a destination of the object message in the switch list for the application i is obtained based on the master information after application of the object master change information piece.

In OP46, the control unit 15 adds 1 to a transmitted message amount $CM_{ik}$ of messages transmitted from the controller k to the switch 9 to update the transmitted message amount $CM_{ik}$.

In OP47, the control unit 15 generates a random number based on a weight $W_{ik}$ of the controller k for the application i, and determines a controller j that is a distribution destination of the object message based on the generated random number.

In OP48, the control unit 15 determines whether or not the controller k that is the master of the object message and the controller j that is a distribution destination of the object message correspond to each other. If the controller k and the controller j correspond to each other (OP48: YES), the processing proceeds to OP45 or OP50 for a next message in the switch list for the relevant application i or a next application. If the controller k and the controller j do not correspond to each other (OP48: NO), the processing proceeds to OP49.

In OP49, it is indicated that the object message is a controller-to-controller message, and thus, the control unit 15 adds 1 to the controller-to-controller message amount interMsgs to update the controller-to-controller message amount interMsgs. Subsequently, the processing proceeds to OP45 or OP50 for a next message in the switch list for the object application i or a next application.

Upon an end of processing in OP45 to OP49 for all of the messages in the switch lists for all of the applications for one master change information piece, the processing proceeds to OP50.

In OP50, the control unit 15 calculates a variance value of transmitted message amounts of messages from the respective controllers to the switches 9. Subsequently, the processing proceeds to OP45 for a next master change information piece. Or, if processing for all of the master change information pieces ends, the processing proceeds to OP33 in FIG. 36.

The processing in OP41 in FIG. 37A corresponds to (step 2-1) in the master change determination processing. The processing in OP43 in FIG. 37A corresponds to (step 2-2) in the master change determination processing. The processing in OP42 and OP44 in FIG. 37A corresponds to (step 2-3) in the master change determination processing. The processing in FIG. 37B corresponds to (step 2-4) in the master change determination processing.

Operation and Effect of Sixth Embodiment

In the sixth embodiment, an imbalance is made to occur in the controllers each serving as a master of a switch 9 by changing a master of a switch 9. According to the imbalance in the controllers each serving as a master of a switch 9, round-robin weights Wij are determined by processing for determining round-robin weights Wij for the load balancing apparatus 3 according to the first to fifth embodiments. Consequently, a controller-to-controller message amount reduction effect can be enhanced.

A switch 9 that is an object of changing a master is determined by simulation so that an imbalance in transmitted message amounts of messages transmitted from the respective controllers to the switches 9 is small and the controller-to-controller message amount is small. Consequently, a processing efficiency of the entire distributed-type communication control system 100 can be enhanced.

Also, in a simulation of distribution of requests from the applications where a master change information piece is applied, round-robin weights Wij for the load balancing apparatus 3 are calculated based on the master information after the application of the master change information piece. The round-robin weights Wij are determined so as to provide a smallest total amount of controller-to-controller messages for each application. Therefore, according to the sixth embodiment, a switch that is an object of changing a master is determined so as to reduce a total amount of controller-to-controller messages for all of the applications.

Seventh Embodiment

In the sixth embodiment, for each of all of the master change information pieces, a simulation is performed for a case where the master change information piece is applied. In the seventh embodiment, master change information pieces for which a simulation is performed are narrowed down to reduce a load relating to processing for the simulation and thereby increase a speed of the processing. In the seventh embodiment, description overlapping that of the sixth embodiment will be omitted. In the seventh embodiment, a system configuration of a distributed-type communication control system 100 and a hardware configuration and a functional configuration of a server 1 are similar to those of the sixth embodiment.

<Master Change Information Narrowing Processing>

Master change information narrowing processing is processing performed before master change information creation processing (step 1) in master change determination processing. Therefore, the master change information narrowing processing will be described as sub-steps of the processing in (step 1) in the master change determination processing. Hereinafter, the description will be provided with a specific example in which a distributed-type communication control system 100A that is similar to that of the sixth embodiment is assumed.

(Step 1-1)

A control unit 15 of a server 1 acquires a direct ratio Aij for each of all of the combinations of a server and an application. Here, the direct ratios Aij are acquired, for example, in a manner that is similar to that of the first embodiment.

FIG. 38 is a diagram indicating an example of direct ratios Aij for applications i in controllers j according to the specific example of the seventh embodiment. In the specific example of the seventh embodiment, there are two controllers and two applications, and thus the direct ratios Aij form a matrix of 2×2.

In the example indicated in FIG. 38, a direct ratio A11 for application #1 in controller #1 is 1/2. A direct ratio A12 for application #1 in controller #2 is 1/2. A direct ratio A21 for application #2 in controller #1 is 2/3. A direct ratio A22 for application #2 in controller #2 is 1/3.

(Step 1-2)

The control unit 15 of the server 1 calculates a variance value of the direct ratios Aij calculated in step 1-1, for each application. However, not limited to a variance value, an index representing a variation may be used, and, for example, a standard deviation or a difference between a largest value and a smallest value may be used.

FIG. 39 is a diagram indicating an example of variance values of direct ratios for respective applications according to the specific example of the seventh embodiment. The variance values of the direct ratios for the respective applications indicated in FIG. 39 are those calculated based on the direct ratios Aij in the example indicated in FIG. 38.

In the example indicated in FIG. 39, a variance value of the direct ratios for application #1 is 0. A variance value of the direct ratios for application #2 is approximately 0.28.

(Step 1-3)

The control unit 15 of the server 1 extracts an application whose variance value of the direct ratios is not more than a threshold value. As the variance value of the direct ratios is smaller, it is indicated that an imbalance between controllers serving as masters of switches 9 in a set region for the relevant application is smaller. Thus, an imbalance is provided to the controllers serving as masters of switches 9 for an application whose variance value of direct ratios is not more than a threshold value, enabling a large effect to be obtained in controller-to-controller message reduction.

For example, where the variance values of the direct ratios for the applications are the values in the example indicated in FIG. 39 and the threshold value is 0.1, the control unit 15 extracts application #1. The processing in steps 1-1 to 1-3 is an example of "acquire[ing], from the plural types of predetermined processing, a first type in which the respective amounts of messages transmitted from the plurality of control apparatuses to the plurality of destination apparatuses controlled by the plurality of control apparatuses are equal to each other". A variance value of direct ratios for an application being not more than a threshold value is an example of "the respective amounts of messages transmitted from the plurality of control apparatuses to the plurality of destination apparatuses controlled by the plurality of control apparatuses are equal to each other".

(Step 1-4)

The control unit 15 of the server 1 extracts a switch 9 having a largest transmitted message amount for the application extracted in step 1-3. Amounts of messages of a predetermined application transmitted to the respective switches 9 are acquired by collecting identification information pieces of switches included in a switch list for the predetermined application. Thus, in the seventh embodiment, switch lists are acquired before the processing in step 1-4. The processing in step 1-4 is an example of "acquire[ing] one or more top destination apparatuses receiving a larger message amount of messages for the predetermined processing of the first type".

FIG. 40 is an example of amounts of messages transmitted to the respective switches 9 for application #1 according to the specific example of the seventh embodiment. In the example indicated in FIG. 40, switch #4 is extracted because the amount of messages transmitted to SW#4 is largest.

(Step 1-5)

The control unit 15 of the server 1 creates a master change information piece in which a master of the switch extracted in step 1-4 is to be changed, based on current master information. For example, in the specific example of the seventh embodiment indicated in FIG. 40, switch #4 is extracted, and thus, the control unit 15 creates a master change information piece for changing a master of switch #4 from controller #1 (see FIG. 28) to controller #2. The processing in step 1-5 is an example of "create[ing] a case example information piece for selecting the acquired one or more destination apparatuses from the plurality of destination apparatuses".

Consequently, the number of master change information pieces for which simulation is performed can be reduced. Here, the specific example is premised on changing a master of one switch 9 from among seven switches 9, and thus, in step 1-4, a switch 9 having a largest transmitted message amount is extracted, but the present invention is not limited to this example. For example, if masters of a plurality of switches 9 are changed, the relevant number of switches 9 having a large transmitted message amount may be extracted. The processing in step 2 onwards is similar to that of the sixth embodiment.

Figure 41:
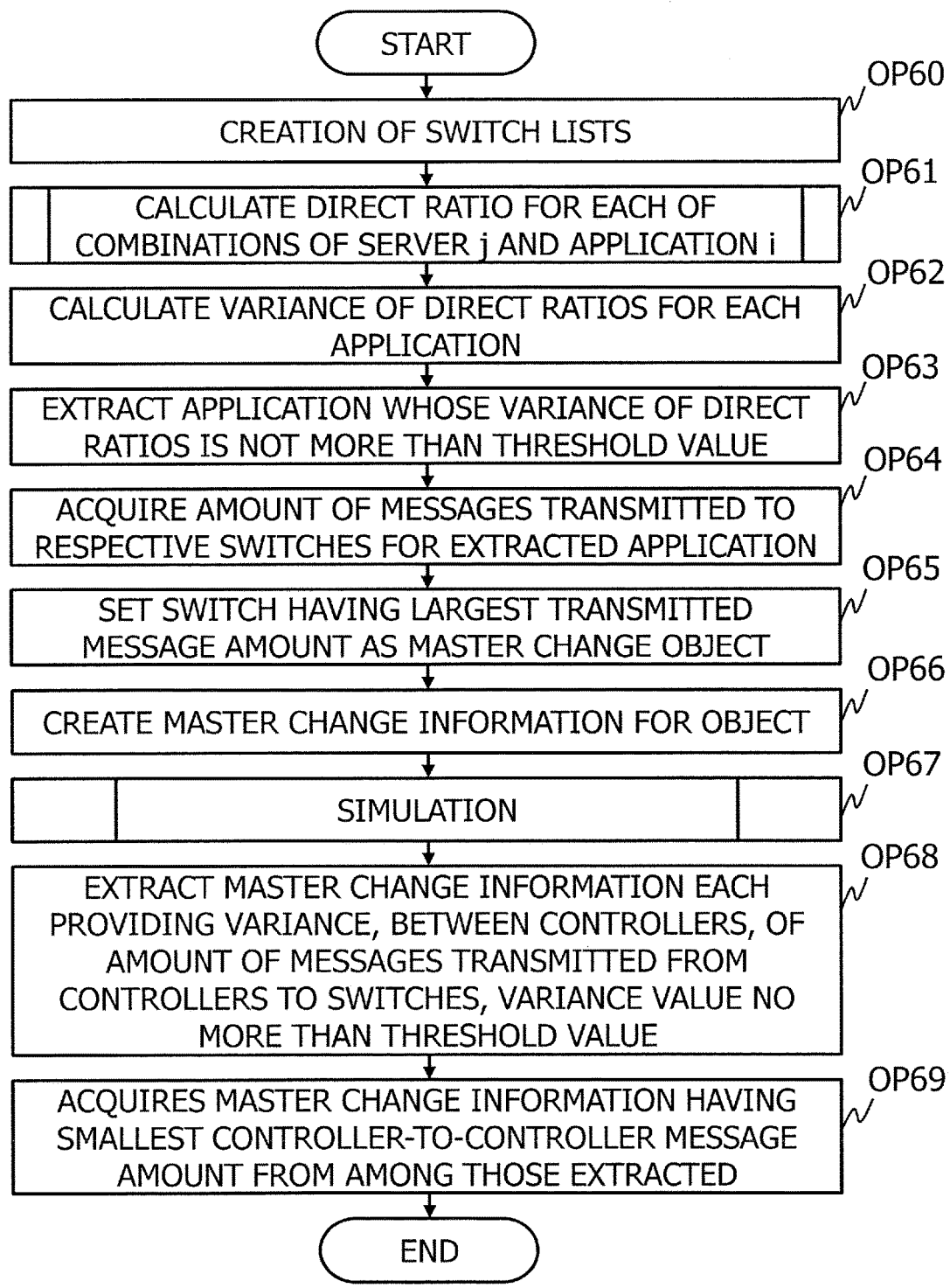
FIG. 41 is an example of a flowchart of master change determination processing according to the seventh embodiment.

FIG. 41 is an example of a flowchart of master change determination processing according to the seventh embodiment. As with the processing indicated in FIG. 36, the processing indicated in FIG. 41 may be performed, for example, on a predetermined period or may be performed upon being triggered by occurrence of a predetermined event. The event serving as a trigger for performing the processing is, for example, an imbalance in direct ratio Aij between the controllers becoming less than a threshold value for an application i. Although an entity of performance in the example indicated in FIG. 41 is a CPU 101 of the server 1, for sake of convenience, the description will be provided with the control unit 15, which is a functional component, as the entity.

In OP60, the control unit 15 creates a switch list for each application.

In OP61, the control unit 15 calculates a direct ratio Aij for each of all of the combinations of a server j and an application i. A method of calculation of the direct ratios Aij is, for example, similar to that of the first embodiment.

In OP62, the control unit 15 calculates a variance value of direct ratios for each application. In OP63, the control unit 15 extracts an application whose variance value of direct ratios is not more than a threshold value.

In OP64, the control unit 15 acquires an amount of messages transmitted to the respective switches 9 for the application extracted in OP63. In OP65, the control unit 15 sets a switch having a largest transmitted message amount as a master change object. However, if there are a plurality of switches 9 as master change objects, the relevant number of top switches 9 having a large transmitted message amount are selected.

In OP66, the control unit 15 creates a master change information piece for changing the master of the switch 9 set as a master change object in OP65. In OP67 to OP69, processing similar to that in OP32 to OP34 in FIG. 36 is performed for the master change information piece created in OP66.

Here, if a single master change information piece is created in OP66 and a variance of transmitted message amounts from the controllers to the switches 9 according to the relevant master change information piece is larger than a threshold value, for example, the processing may be performed as follows. The processing proceeds to OP65, and the control unit 15 sets a switch having a second largest transmitted message amount as a master change object, creates a master change information piece (OP66) and performs a simulation for the master change information piece.

Operation and Effect of Seventh Embodiment

In the seventh embodiment, a master change information piece for changing a master for a switch meeting a condition is created instead of creating a master change information piece for each of all of patterns of changing a master for a switch. Consequently, simulation processing can be reduced, which enables an increase in speed of master change determination processing. Also, a processing load on the server 1 relating to simulation can be reduced.

Also, a switch 9 having a large transmitted message amount is set as a master change object, for an application whose imbalance between controllers each serving as a master is small, and thus, a master change information piece that enables reduction of controller-to-controller messages can be created.

The disclosed information processing apparatus and load balancing control method enable, for a plurality of control apparatuses between which requests to applications are balanced, reduction of message forwarding between the control apparatuses.

<Recording Medium>

A program for causing a computer or another machine or apparatus (hereinafter, "computer or the like") to provide any of the above-described functions can be recorded into a recording medium that can be read by a computer or the like. The program in the recording medium is read into the computer or the like and executed, enabling provision of the function.

Here, the recording medium that can be read by the computer or the like refers to a non-transitory recording medium that can store information such as data and/or programs by means of electrical, magnetic, optical, mechanical or chemical action and can be read from the computer or the like. From among such recording mediums, ones that can be removed from the computer or the like include, for example, a flexible disk, a magnetooptical disk, a CD-ROM, a CD-R/W, DVD, a Blu-ray disk, a DAT, an 8 mm tape and a memory card such as a flash memory. Also, recording mediums fixed to the computer or the like include, e.g., a hard disk and a ROM (read-only memory). Furthermore, an SSD (solid state drive) can be used as either a recording medium that can be removed from the computer or the like or a recording medium fixed to the computer or the like.

All examples and conditional language provided herein are intended for the pedagogical purposes of aiding the reader in understanding the invention and the concepts contributed by the inventor to further the art, and are to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a first processor configured to, for each of a plurality of control apparatuses, determine weights to be used for distribution of requests for predetermined processing so that a larger amount of requests for the predetermined processing is distributed to a first control apparatus controlling a larger number of destination apparatuses as control objects,
   wherein each of the plurality of the control apparatuses includes its own second processor, and the own second processor is configured to:
   receive a request;
   perform the predetermined processing according to the request;
   create a message;
   transmit the message to a first destination apparatus that is a destination of the message when the first destination apparatus is a control object of own control apparatus including the own second processor; and
   forward the message to another control apparatus when the first destination apparatus is a control object of the another control apparatus.

2. The information processing apparatus according to claim 1, further comprising a storage configured to, for each of the plurality of the control apparatuses, store information on the destination apparatuses as the control objects,
   wherein for each of the plurality of the control apparatuses, the first processor is configured to determine, as the weights of each of the plurality of the control apparatuses, a ratio of the number of destination apparatuses as the control objects of each of the plurality of the control apparatuses to a total number of destination apparatuses as the control objects of all of the plurality of the control apparatuses.

3. The information processing apparatus according to claim 1, wherein the first processor is configured to:
   receive an amount of requests for each of plural types of predetermined processing from each of the plurality of the control apparatuses, the requests being received by each of the plurality of the control apparatuses;
   acquires a value of an amount $X_{ij}$ of requests for a predetermined processing of a type i, wherein the value makes a value of an objective function $\Sigma A_{ij}*X_{ij}$ (* is a multiplication symbol) largest under constraint conditions in linear programming, wherein the requests are distributed to a control apparatus j, wherein the variable i is equal to or larger than 1 and equal to or smaller than the number of types of predetermined processing, and wherein the variable j is equal to or larger than 1 and equal to or smaller than the number of the plurality of the control apparatuses; and
   determine a ratio of the acquired value of $X_{ij}$ to a total sum of respective amounts of requests received by the plurality of the control apparatuses for the predetermined processing of the type i, as a weight to be used for distribution of requests for the predetermined processing of the type i to the control apparatus j,
   wherein the $A_{ij}$ is a constant and a ratio of the number of the destination apparatuses as a control object of the control apparatus j to a total number of destination apparatuses that are destinations of messages for predetermined processing of the type i from among the plural types of predetermined processing; the $X_{ij}$ is a variable and an amount of requests for the predetermined processing of the type i, the request being distributed to the control apparatus j; the constraint conditions is that $\Sigma_j X_{ij}$ ($\Sigma_j$: summation for j) is an upper limit value of an amount of requests that can be distributed to the control apparatus j, and $\Sigma_i X_{ij}$ ($\Sigma_i$: summation for i) is the total sum of respective amounts of requests received by the plurality of control apparatuses for the predetermined processing of the type i.

4. The information processing apparatus according to claim 3, wherein the first processor is configured to determine, for each of the plurality of the control apparatuses, the upper limit value of the amount of requests that can be distributed to a control apparatus as a value having a predetermined tolerable margin.

5. The information processing apparatus according to of claim 3, wherein the first processor is configured to:
   receive, from each of the plurality of the control apparatuses, an amount of requests for each of the plural types of predetermined processing, the requests being received by the control apparatus; and
   determine, for each of the plurality of the control apparatuses, the upper limit value of the amount of requests that can be distributed to a control apparatus as a value obtained by dividing a total sum of respective amounts of requests received by the plurality of the control apparatuses for the plural types of predetermined processing by the number of the plurality of the control apparatuses.

6. The information processing apparatus according to claim 3, wherein the first processor is configured to determine, for each of the plurality of the control apparatuses, the upper limit value of the amount of requests that can be distributed to a control apparatus according to processing performance of the control apparatus.

7. The information processing apparatus according to claim 1, wherein the first processor is configured to:
   select one or more destination apparatuses from a plurality of destination apparatuses controlled by the plurality of control apparatuses, respectively;
   determine whether or not the selected one or more destination apparatuses meet a condition including an amount of messages forwarded between the plurality of control apparatuses being reduced and respective amounts of message transmitted from the plurality of control apparatuses to the plurality of destination apparatuses being equal to each other, when the control apparatus controlling the selected one or more destination apparatuses is changed to another control apparatus; and
   make determination to change the control apparatus controlling the selected one or more destination apparatuses to the other control apparatus when the selected one or more destination apparatuses meet the condition.

8. The information processing apparatus according to claim 7, wherein the first processor is configured to:
   create a plurality of case example information pieces each indicating a case example in which one or more destination apparatuses are selected from the plurality of destination apparatuses;
   determine the weights for a case where a control apparatus controlling the selected one or more destination apparatuses is changed to another control apparatus, for each of the plurality of case example information pieces created; and
   simulate distribution of requests for the predetermined processing based on the determined weights to acquire an amount of messages forwarded between the plurality of control apparatuses, and an index value indicating a variation, between the plurality of control apparatuses, of respective message amounts transmitted from the plurality of control apparatuses to the destination apparatuses controlled by the plurality of control apparatuses, as the condition, extract a case example information piece that provides a smallest amount of messages forwarded between the controllers from among case example information pieces each providing an index value that is not more than a predetermined threshold value, the index value indicating the variation, and make determination to change a control apparatus controlling one or more destination apparatuses selected in the extracted case example information to another control apparatus.

9. The information processing apparatus according to claim 8, wherein:
   the second processor included in the each of the plurality of control apparatuses is configured to perform plural types of predetermined processing and create messages;
   the first processor is configured to acquire, from the plural types of predetermined processing, a first type in which the respective amounts of messages transmitted from the plurality of control apparatuses to the plurality of destination apparatuses controlled by the plurality of control apparatuses are equal to each other, acquire one or more top destination apparatuses receiving a larger message amount of messages for the predetermined processing of the first type and create a case example information piece for selecting the acquired one or more destination apparatuses from the plurality of destination apparatuses.

10. An information processing apparatus comprising a first processor configured to:
    receive, from each of a plurality of control apparatuses, an amount of a first message transmitted from a control apparatus to a destination apparatus and an amount of a second message forwarded from the control apparatus to another control apparatus, the first message and the second message created by the control apparatus performing predetermined processing;
    determine, for each of the plurality of the control apparatuses, a weight to be used for distribution of requests for the predetermined processing based on a first ratio of the amount of the first message for the control apparatus or a second ratio of the amount of the second message for the control apparatus to a total amount of messages created by the predetermined processing by the control apparatus so that a larger amount of requests for the predetermined processing is distributed to a control apparatus which has a higher first ratio or a lower second ratio,
    wherein each of the plurality of the control apparatuses includes its own second processor, and the own second processor is configured to:
    receive a request;
    perform the predetermined processing according to the request;
    create a message,
    transmit the message to the destination apparatus when a destination apparatus that is a destination of the message is a control object of the own control apparatus including the own second processor, and
    forward the message to another control apparatus in the plurality of the control apparatuses when the destination apparatus that is the destination of the message is a control object of the another control apparatus.

11. The information processing apparatus according to claim 10, wherein:
    the second processor of each of the plurality of the control apparatuses is configured to perform plural types of predetermined processing, and create messages; and
    the first processor is configured to:
    receive the amount of the first message and the amount of the second message for each of the plural types of predetermined processing from each of the plurality of the control apparatuses;
    calculate the first ratio or the second ratio for each of the plural types of predetermined processing performed by each of the plurality of the control apparatuses; and
    determine the respective weights to be used for distribution of the requests to the plurality of the control apparatuses for each of the plural types of the predetermined processing.

12. The information processing apparatus according to claim 10, wherein the first processor is configured to determine an upper limit value of an amount of requests that can be distributed for each of the plurality of the control apparatuses, and determine the respective weights to be used for distribution of the requests to the plurality of the control apparatuses based on the first ratios or the second ratios and the upper limit values of the amounts of requests so that a larger amount of requests for the predetermined processing is distributed to a control apparatus having a higher first ratio or a lower second ratio, and the respective amounts of requests distributed to the plurality of the control apparatuses do not exceed the respective upper limit values for the control apparatuses.

13. The information processing apparatus according to claim 12, wherein the first processor is configured to:
    receive, from each of the plurality of the control apparatuses, an amount of requests for each of the plural types of predetermined processing, the requests being received by the control apparatus;
    acquire a value of an amount $X_{ij}$ of requests for predetermined processing of a type i, wherein the value makes a value of an objective function $\Sigma A_{ij}*X_{ij}$ (* is a multiplication symbol) largest or smallest under constraint conditions in linear programming, wherein the requests are distributed to the control apparatus j, wherein the variable i is equal to or larger than 1 and equal to or smaller than the number of types of predetermined processing, and wherein the variable j is equal to or larger than 1 and equal to or smaller than the number of the plurality of the control apparatuses; and determines a ratio of the acquired value of Xij to a total sum of respective amounts of requests received by the plurality of the control apparatuses for the predetermined processing of the type i, as a weight to be used for distribution of the requests for the predetermined processing of the type i to the plurality of the control apparatuses j, wherein the Aij is a constant and a ratio of the first ratio or the second ratio for the predetermined processing of the type i from among the plural types of predetermined processing performed by the control apparatus j;

the Xij is a variable and an amount of requests for the predetermined processing of the type i, the requests being distributed to the control apparatus j, the constraint conditions is that $\Sigma_j Xij$ ($\Sigma_j$: summation for j) is an upper limit value of the amount of requests that can be processed by the control apparatus j, and $\Sigma_i Xij$ ($\Sigma_i$: summation for i) is a total sum of respective amounts of requests received by the plurality of the control apparatuses for the predetermined processing of the type i.

14. The information processing apparatus according to claim 12, wherein the first processor is configured to:

receive, from each of the plurality of the control apparatuses, an amount of requests for each of the plural types of predetermined processing, the requests being received by the control apparatus;

perform first processing for each of the plural types of predetermined processing, based on the upper limit values of the respective amounts of requests that can be processed by the plurality of the control apparatuses and a total amount of requests to the plurality of the control apparatuses for each of the plural types of predetermined processing, the first processing for assigning a request for predetermined processing of a type i to a control apparatus j corresponding to a first ratio having a highest value from among the respective first ratios for the plural types of predetermined processing performed by the plurality of the control apparatuses, wherein the variable i is equal to or larger than 1 and equal to or smaller than the number of types of predetermined processing, and wherein the variable j is equal to or larger than 1 and equal to or smaller than the number of the plurality of the control apparatuses;

repeats the first processing for the first ratio Aij in descending order of the first ratio, after a request amount assigned to the control apparatus j reaching the upper limit, for remaining apparatus except the control apparatus j, until a total of respective request amounts for the plural types of predetermined processing become zero; and determine respective ratios of the respective request amounts assigned to the plurality of the control apparatuses for the plural types of processing, as respective weights to be used for distribution of the requests to the plurality of the control apparatuses.

15. The information processing apparatus according to claim 10, wherein the first processor is configured to make determination to stop first predetermined processing executed on the first control apparatus, the first predetermined processing corresponding to a first weight, the first control apparatus corresponding to the first weight, and the first weight being lower than a predetermined threshold value.

16. A load balancing control method executed by a first processor included in a computer, comprising:

storing information on destination apparatuses controlled by a control apparatus for each of control apparatuses; and determining, for each of the plurality of the control apparatus, weights to be used for distribution of requests for predetermined processing so that a larger amount of requests for the predetermined processing is distributed to a first control apparatus controlling a larger number of destination apparatuses as control objects, wherein each of the plurality of control apparatus includes its own second processor, and the own second processor is configured to:

receive a request;

perform the predetermined processing according to the request;

create a message;

transmit the message to a first destination apparatus that is a destination of the message when the first destination apparatus is a control object of the own control apparatus including the own second processor; and forward the message to another control apparatus when the first destination apparatus is a control object of the another control apparatus.

* * * * *